(12) United States Patent
Keightley

(10) Patent No.: US 7,097,397 B2
(45) Date of Patent: Aug. 29, 2006

(54) HOLE-SAW ASSEMBLY INCLUDING TWO HOLE-SAWS

(76) Inventor: Kym John Keightley, 5 Vincenzo Street, Fairview Park, South Australia, 5126 (AU)

( * ) Notice: Subject to any disclaimer, the term of this patent is extended or adjusted under 35 U.S.C. 154(b) by 168 days.

(21) Appl. No.: 10/921,892

(22) Filed: Aug. 20, 2004

(65) Prior Publication Data
US 2005/0042048 A1 Feb. 24, 2005

(30) Foreign Application Priority Data
Aug. 22, 2003 (AU) .............................. 2003904524

(51) Int. Cl.
*B23B 51/04* (2006.01)
(52) U.S. Cl. .................... 408/204; 408/239 R
(58) Field of Classification Search ................ 408/204, 408/206, 207, 209, 703, 238, 239 R; 279/77, 279/78, 79, 80, 89; B23B 51/04
See application file for complete search history.

(56) References Cited

U.S. PATENT DOCUMENTS

| 2,779,361 | A | * | 1/1957 | McKiff ..................... 408/204 |
| 3,267,975 | A | * | 8/1966 | Enders ..................... 408/200 |
| 3,973,862 | A | * | 8/1976 | Segal ...................... 408/204 |
| 2004/0179911 | A1 | * | 9/2004 | Keightlev ................. 408/204 |

FOREIGN PATENT DOCUMENTS

WO  WO 2003024677 A1 * 3/2003
WO  WO 2004082875 A1 * 9/2004
WO  WO 2004085104 A1 * 10/2004

* cited by examiner

*Primary Examiner*—Daniel W. Howell
(74) *Attorney, Agent, or Firm*—O. M. (Sam) Zaghmout; Bio Intellectual Property Service (BIO IPS) LLC

(57) ABSTRACT

The present invention relates to an improved hole-saw assembly and in particular, to a mandrel engageable by a drill and including at least one locking ring or annulus that allows for the base of two hole-saws of different diameter to be quickly and easily mountable and demountable from the mandrel. The hole-saw assembly includes a first hole-saw having a base that includes a pair of drive-pins extending outwardly therefrom and a pair of apertures for insertion therethrough of the drive pins of a second hole-saw. The drive pin pairs are then inserted through corresponding apertures in the mandrel to engage an annulus coupled to the mandrel. The present invention provides for each drive pin to be engaged by the annulus despite the difference in longitudinal length of the drive pins beyond the base of the first hole-saw. The hole-saws are snap-fit within the annulus and may be disengaged by simply rotating the annulus to a second position. A further embodiment of the present invention further allows one to insert the hole-saws into any one of the mandrel insertion points without being concerned about whether it contains the correct engaging means or not. A still further embodiment of the invention prevents slight longitudinal movement which is known to occur when the hole-saws are coupled to the mandrel.

22 Claims, 23 Drawing Sheets

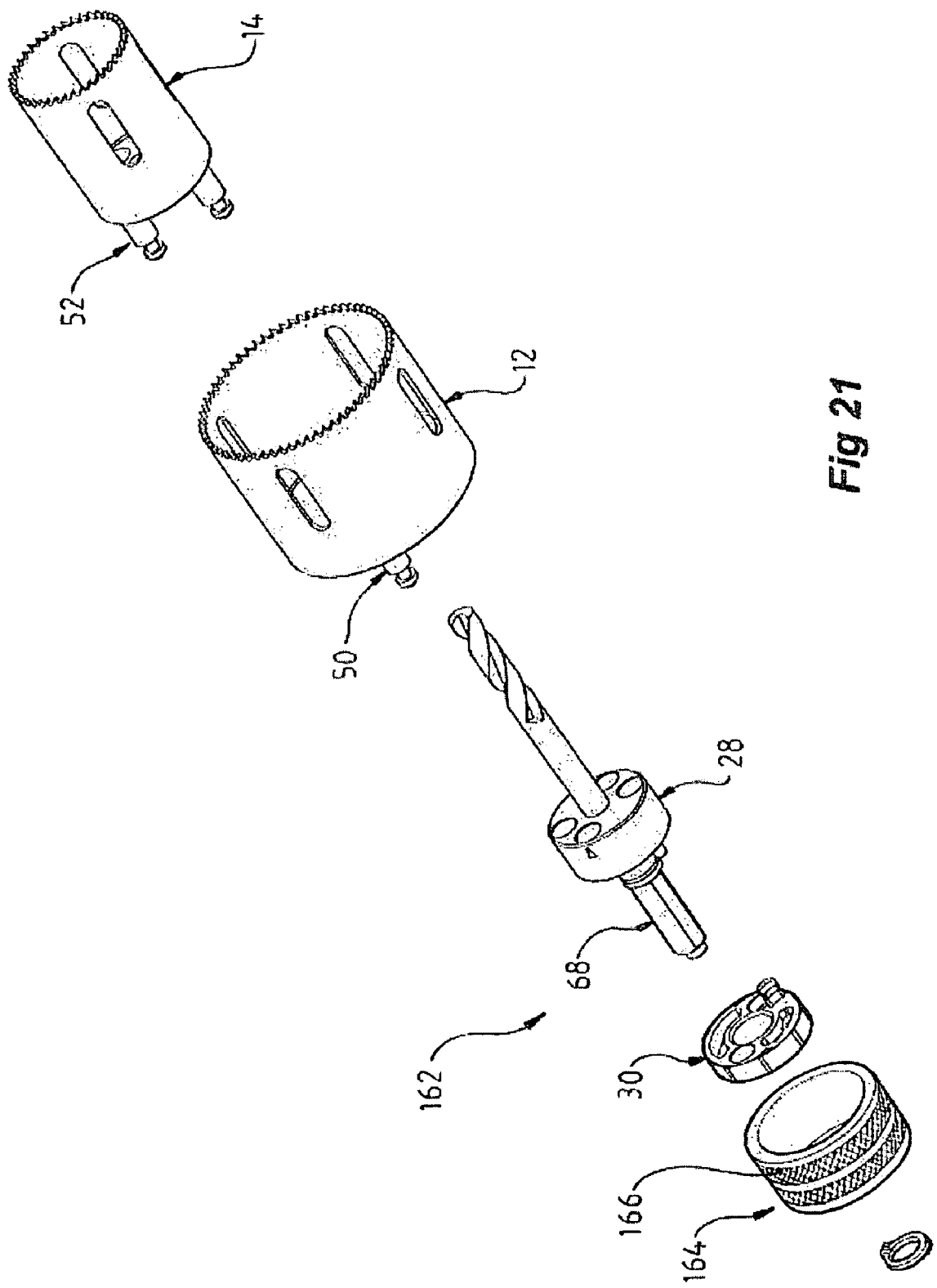

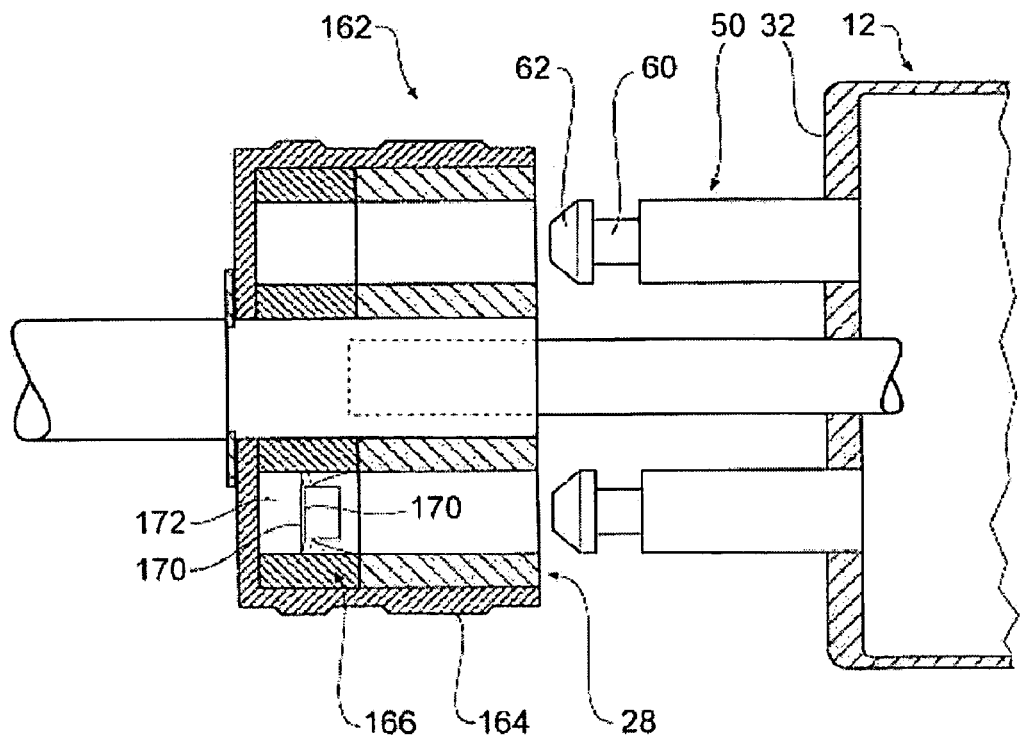
Fig 22
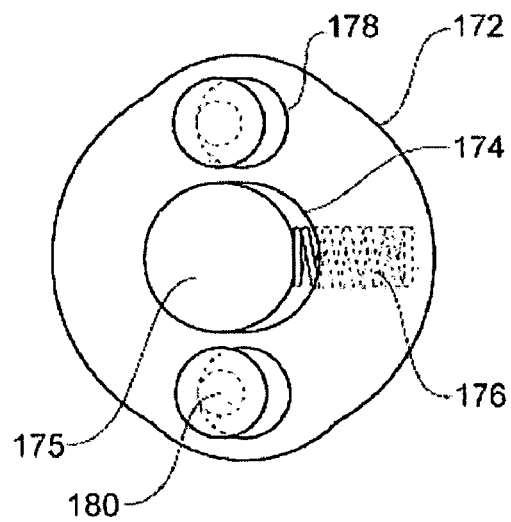
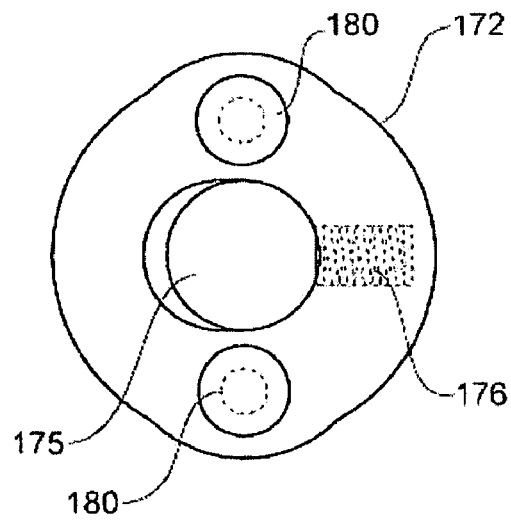
Fig 25a                Fig 25b

HOLE-SAW ASSEMBLY INCLUDING TWO HOLE-SAWS

CROSS-REFERENCE TO RELATED APPLICATIONS

This application claims the benefit of AU 2003904524, filed 22 Aug. 2003 by the present inventor.

FEDERALLY SPONSORED RESEARCH

Not Applicable

SEQUENCE LISTING OR PROGRAM

Not Applicable

BACKGROUND OF THE INVENTION—FIELD OF THE INVENTION

The present invention relates to an improved hole-saw assembly and in particular, to a mandrel engageable by a drill and including at least one locking ring or annulus that allows for the base of two hole-saws of different diameter to be quickly and easily mountable and demountable from the mandrel.

BACKGROUND OF THE INVENTION

Hole-saws typically include a flat, solid base which provides support for a cylindrically shaped member protruding therefrom that includes cutting teeth at its circular end. The base is generally locked by a drill mandrel and includes a central bore through which a pilot drill, also locked by the mandrel, may pass. Some hole-saw bases are known to include multiple diameter grooves adapted to accommodate hole-saws of different diameters.

Although it is relatively well known that hole-saw bases include means to engage hole-saws of different diameter, the simultaneous use of two different sized hole saws is a relatively new development. One of the many situations involving two hole-saws rotating simultaneously rather than a single hole-saw is where a hole in a material is required to be enlarged. The internal hole-saw may act as an aligning pilot drill that is of slightly less diameter to the hole, while the outer hole-saw may be used to enlarge the hole.

The current applicant is the owner of various Patent Applications dealing with the quick and easy mounting and demounting of a hole-saw to a drill mandrel, and also of various connection means between a hole-saw and a mandrel. For example, PCT/AU04/00376 entitled 'An improved hole-saw boss', which teaches the use of two threaded sections of different diameter projecting from the hole-saw base adapted to engage the corresponding bore diameters of two different sized hole-saws. Further, PCT/AU02/01296 entitled 'An improved hole-saw assembly', which discloses the use of a hole-saw base including two shafts adapted to extend through the drill mandrel and be locked by a locking ring or annulus. The contents of the abovementioned patent applications are incorporated by reference herein.

A number of problems have been encountered using the abovementioned hole-saw assemblies. Firstly, the double-threaded boss, although useful in connecting different sized hole-saws simultaneously, is quite cumbersome in that the user may need to screw on and unscrew a number of different hole-saws in a single application. Secondly, the connection means mentioned above, although simplifying the method of connecting the hole-saw to the mandrel, does not allow two hole-saws to be connected to a single mandrel at once.

It is therefore an object of the present invention to overcome at least some of the aforementioned problems or to provide the public with a useful alternative.

SUMMARY OF THE INVENTION

In one form of the invention there is proposed a hole-saw assembly including:

a first hole-saw aligned along a central longitudinal axis, said hole-saw including a transverse base from which extends a cylindrical hole-saw body having a plurality of cutting teeth, a pair of shafts diametrically opposed about said longitudinal axis extending in the opposite direction to said hole-saw body, and a pair of diametrically opposed apertures radially disposed from said diametrically opposed shafts;

a second hole-saw including a transverse base from which extends a cylindrical hole-saw body having a plurality of cutting teeth, said second hole-saw body being of a lesser diameter to that of the first hole-saw body, said second hole-saw further including a pair of shafts diametrically opposed about said longitudinal axis extending in the opposite direction to said hole-saw body and adapted to be inserted into said diametrically opposed apertures of the first hole-saw base, said shaft pairs of the first and second hole-saws being of the same length such that once inserted, the second shaft pair extends a longitudinal distance less than that of the first shaft pair from the base of the first hole-saw; and a mandrel coupled to said first hole-saw base via at least one annulus including a first locking means adapted to engage the shaft pair of said first hole-saw, and a longitudinally spaced apart second locking means adapted to engage the shaft pair of said second hole-saw.

Preferably said mandrel includes a first pair of longitudinal apertures aligned for insertion therethrough of the pair of shafts from the first hole-saw, and a second pair of longitudinal apertures aligned for insertion therethrough of the pair of shafts from the second hole-saw.

In preference when each hole-saw shaft is inserted through said mandrel such that the base of the first hole-saw abuts with a longitudinal end of the mandrel, the first pair of shafts is received within the first locking means and the second pair of shafts is received within the second locking means.

In preference each of said locking means involves movement of the at least one annulus from a first position wherein insertion and withdrawal of the shaft pairs is not possible, and a second position wherein the shaft pairs may be freely inserted and withdrawn.

In preference the annulus includes an arrangement of aperture pairs having associated therewith a corresponding locking mechanism, the aperture pairs aligned with aperture pairs of the mandrel such that when an annulus is in the first position, the corresponding aperture pairs of the annulus and mandrel are misaligned, and when the annulus is in the second position, the corresponding aperture pairs of the annulus and mandrel are aligned.

Preferably the annulus includes an arrangement of aperture pairs having associated therewith a corresponding locking mechanism, the aperture pairs aligned with aperture pairs of the mandrel such that when an annulus is in the first position, the corresponding aperture pairs if the annulus and mandrel are misaligned, and when the annulus is in the second position, the corresponding aperture pairs of the annulus and mandrel are aligned, said annulus being biased in the first position.

In preference when a shaft pair is initially received within an annulus which is biased in an engaged position, the annulus locking means includes a lip having a first surface which is encountered in the path of at least one of the shafts of the shaft pair such that insertion of the shaft causes said lip and hence said annulus to move from said first position to a second position to allow for insertion of the shafts therethrough.

Preferably each of the shafts in each shaft pair includes a recessed portion adjacent the end of the shaft such that when said shaft has been inserted a pre-determined distance past a first surface of an annulus locking means lip, the annulus moves into an engaged position and in doing so, the recessed portion moves against the lip whereby a second flat surface of the lip prevents the shaft from being withdrawn.

Preferably each of the shafts in each shaft pair includes a recessed portion adjacent the end of the shaft and said annulus locking means includes a lip having a first surface, a second ramped surface having a void extending thereal-ong, and a third surface extending substantially perpendicularly to said ramped surface such that when said shaft has been inserted a pre-determined distance within said annulus, contact with the first surface causes the annulus to move back into an engaged position and in doing so, the recessed portion of the shaft moves within the void whilst the second ramped surface causes the shaft to move against the third surface so as to prevent even the slightest longitudinal movement of the shaft.

Preferably each shaft of the shaft pairs include a chamfered cap at ends thereof adjacent the recessed portions, said chamfered caps adapted to slide against a surface of a lip in each annulus locking means to thereby move said annulus to allow for insertion through of the shaft pair.

In preference each shaft of the shaft pairs includes a first end chamfered cap, an adjacent first recessed portion, a second chamfered cap adjacent the first recessed portion, and a second recessed portion adjacent the second chamfered cap, said first and second chamfered caps adapted to slide against a surface of a lip in the first and/or second annulus locking means to thereby move said annulus to allow for insertion through of the shaft pair.

In preference the annulus is moveable between a first position whereby said first and second locking means are engaged, and a second position whereby said first and second locking means are disengaged, said movement being by way of rotation.

Preferably the annulus is moveable between a first position whereby said first and second locking means are engaged, and a second position whereby said first and second locking means are disengaged, said movement being by way of transverse shift.

In a further form of the invention there is proposed a hole-saw assembly including:
a first hole-saw aligned along a central longitudinal axis, said hole-saw including a transverse base from which extends a cylindrical hole-saw body having a plurality of cutting teeth, a pair of drive pins diametrically opposed about said longitudinal axis extending in the opposite direction to said hole-saw body, and a pair of diametrically opposed apertures radially disposed from said diametrically opposed drive pins;
a second hole-saw including a transverse base from which extends a cylindrical hole-saw body having a plurality of cutting teeth, said second hole-saw body being of a lesser diameter to that of the first hole-saw body, said second hole-saw further including a pair of drive pins diametrically opposed about said longitudinal axis extending in the opposite direction to said hole-saw body and adapted to be inserted into said diametrically opposed apertures of the first hole-saw base, said drive pin pairs of the first and second hole-saws being of the same length such that once inserted, the second drive pin pair extends a longitudinal distance less than that of the first drive pin pair from the base of the first hole-saw;
a mandrel including two pairs of longitudinal apertures through which said first and second pairs of drive pins are adapted to be inserted; and
an annulus coupled to said mandrel, said annulus including two pairs of diametrically opposed apertures, the first pair of apertures having associated therewith a first locking means for engaging an engagement surface of the second pair of drive pins adjacent the mandrel, and the second pair of apertures extending longitudinally beyond the first pair of apertures and having associated therewith a second locking means for engaging an engagement surface of the first pair of drive pins.

Preferably said annulus is rotatable from a first biased position to a second position, whereby when the annulus is in the first position, each locking means engages corresponding drive pins and thereby prevents them from longitudinal movement, and when the annulus is in the second position, each locking means disengages corresponding drive pins and thereby allows for movement in the longitudinal direction.

Advantageously the first and second pairs of apertures of the annulus have associated therewith locking means capable of engaging the first and/or second drive pin pairs, where in such circumstances, the drive pins also include two correspondingly positioned engagement surfaces.

In a still further form of the invention there is proposed a hole-saw assembly including:
a first hole-saw aligned along a central longitudinal axis, said hole-saw including a transverse base from which extends a cylindrical hole-saw body having a plurality of cutting teeth, a pair of drive pins diametrically opposed about said longitudinal axis extending in the opposite direction to said hole-saw body, and a pair of diametrically opposed apertures radially disposed from said diametrically opposed drive pins;
a second hole-saw including a transverse base from which extends a cylindrical hole-saw body having a plurality of cutting teeth, said second hole-saw body being of a lesser diameter to that of the first hole-saw body, said second hole-saw further including a pair of drive pins diametrically opposed about said longitudinal axis extending in the opposite direction to said hole-saw body and adapted to be inserted into said diametrically opposed apertures of the first hole-saw base, said drive pin pairs of the first and second hole-saws being of the same length such that once inserted, the second drive pin pair extends a longitudinal distance less than that of the first drive pin pair from the base of the first hole-saw;
a mandrel including two pairs of longitudinal apertures through which said first and second pairs of drive pins are adapted to be inserted; and
a first annulus coupled to said mandrel and including two pairs of diametrically opposed apertures, the first pair of apertures having associated therewith a first locking means for engaging an engagement surface of the second pair of drive pins, and the second pair of apertures allowing the engagement surface of the first pair of drive pins to extend to a second annulus coupled to the first annulus, said second annulus having associated therewith a second locking means for engaging the engagement surface of the first pair of drive pins.

Preferably said first and second annuluses are rotatable independently of the other from a first biased position to a second position, whereby when the first or second annulus is in the first position, each corresponding locking means engages corresponding drive pins and thereby prevents them from longitudinal movement, and when the first or second annulus is in the second position, each corresponding locking means disengages corresponding drive pins and thereby allows for movement in the longitudinal direction.

Advantageously the first and second annuluses have associated therewith locking means capable of engaging the first and/or second drive pin pairs, where in such circumstances, the drive pins also include two correspondingly positioned engagement surfaces.

In a yet further form of the invention there is proposed a hole-saw assembly including:

a first hole-saw aligned along a central longitudinal axis, said hole-saw including a transverse base from which extends a cylindrical hole-saw body having a plurality of cutting teeth, a pair of drive pins diametrically opposed about said longitudinal axis extending in the opposite direction to said hole-saw body, and a pair of diametrically opposed apertures radially disposed from said diametrically opposed drive pins;

a second hole-saw including a transverse base from which extends a cylindrical hole-saw body having a plurality of cutting teeth, said second hole-saw body being of a lesser diameter to that of the first hole-saw body, said second hole-saw further including a pair of drive pins diametrically opposed about said longitudinal axis extending in the opposite direction to said hole-saw body and adapted to be inserted into said diametrically opposed apertures of the first hole-saw base, said drive pin pairs of the first and second hole-saws being of the same length such that once inserted, the second drive pin pair extends a longitudinal distance less than that of the first drive pin pair from the base of the first hole-saw;

a mandrel including two pairs of longitudinal apertures, said first pair of apertures having associated therewith a recess, said second pair of apertures allowing for insertion of the first pair of drive pins; and an annulus coupled to said mandrel, said annulus including a pair of diametrically opposed apertures and an engaging lip projecting within said mandrel recess, the engaging lip having associated therewith a first locking means for engaging an engagement surface of the second pair of drive pins, and the pair of apertures having associated therewith a second locking means for engaging an engagement surface of the first pair of drive pins.

Preferably said annulus is rotatable from a first biased position to a second position, whereby when the annulus is in the first position, each locking means engages corresponding drive pins and thereby prevents them from longitudinal movement, and when the annulus is in the second position, each locking means disengages corresponding drive pins and thereby allows for movement in the longitudinal direction.

Advantageously said annulus includes two or more locking lips which extend within a corresponding mandrel recess, and a pair of apertures having associated therewith locking means capable of engaging the first and/or second drive pin pairs, where in such circumstances, the drive pins also include two correspondingly positioned engagement surfaces.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

FIG. 21 illustrates an exploded perspective view of a hole-saw assembly in accordance with a further aspect of the present invention whereby the hole-saw assembly including a sleeve which encloses the annulus and mandrel;

FIG. 22 illustrates a partial cross-sectional view of a pair of hole-saw drive pins prior to entering a mandrel for engagement with an annulus having a ramped engagement lip;

FIG. 25a illustrates a top view of an annulus in accordance with a still further aspect of the invention in an open state; and FIG. 25b illustrates a top view of the annulus of FIG. 24a in an engaged state.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts. For example, FIGS. 1–25 illustrate a number of different embodiments of the present invention. There are various components of the hole-saw assemblies which are common throughout the embodiments and will thus be referred to using like numbers.

Figure 1:
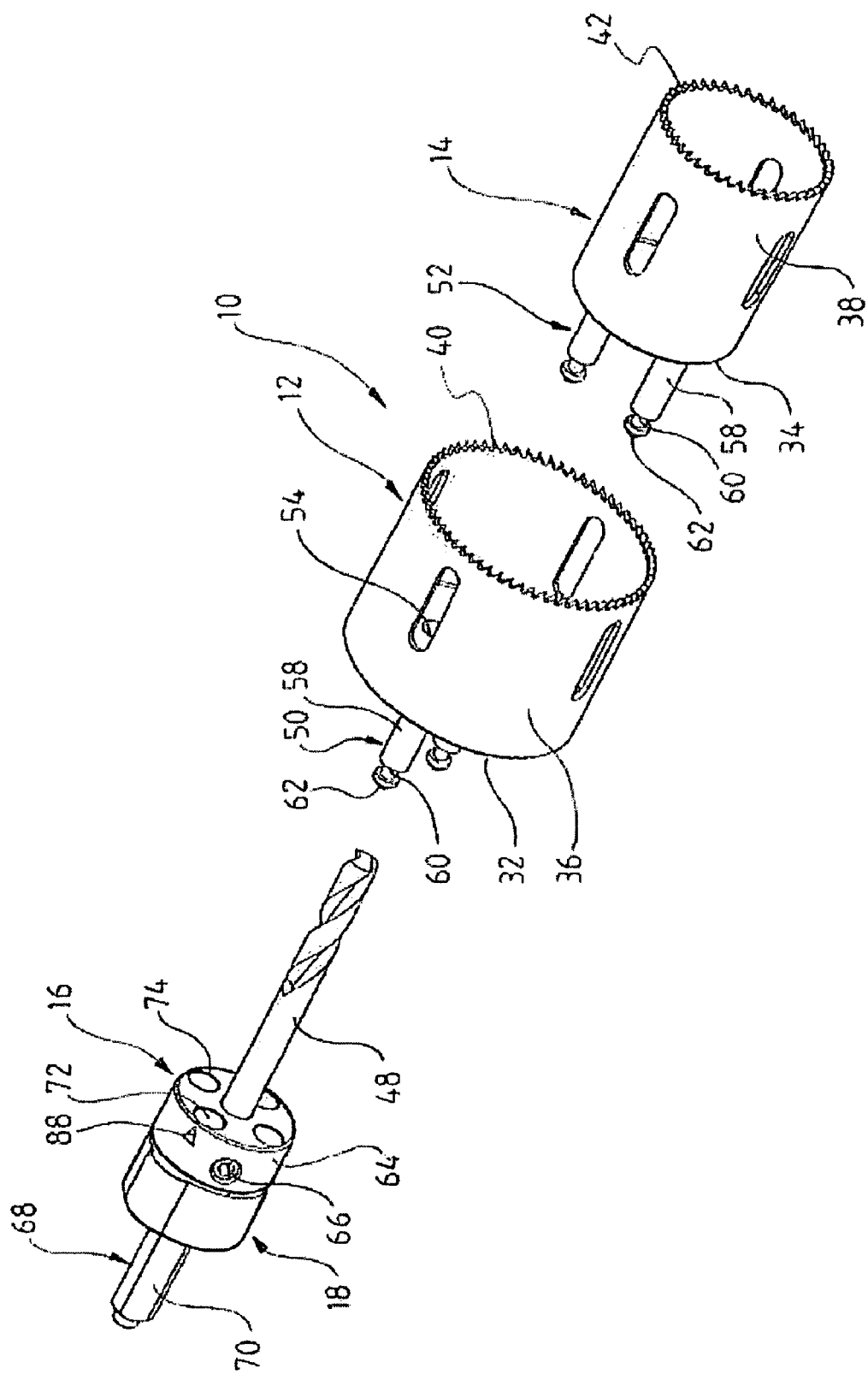
FIG. 1 illustrates an exploded perspective view of a hole-saw assembly in accordance with a first embodiment of the present invention whereby the hole-saw assembly includes a single annulus.
Figure 2:
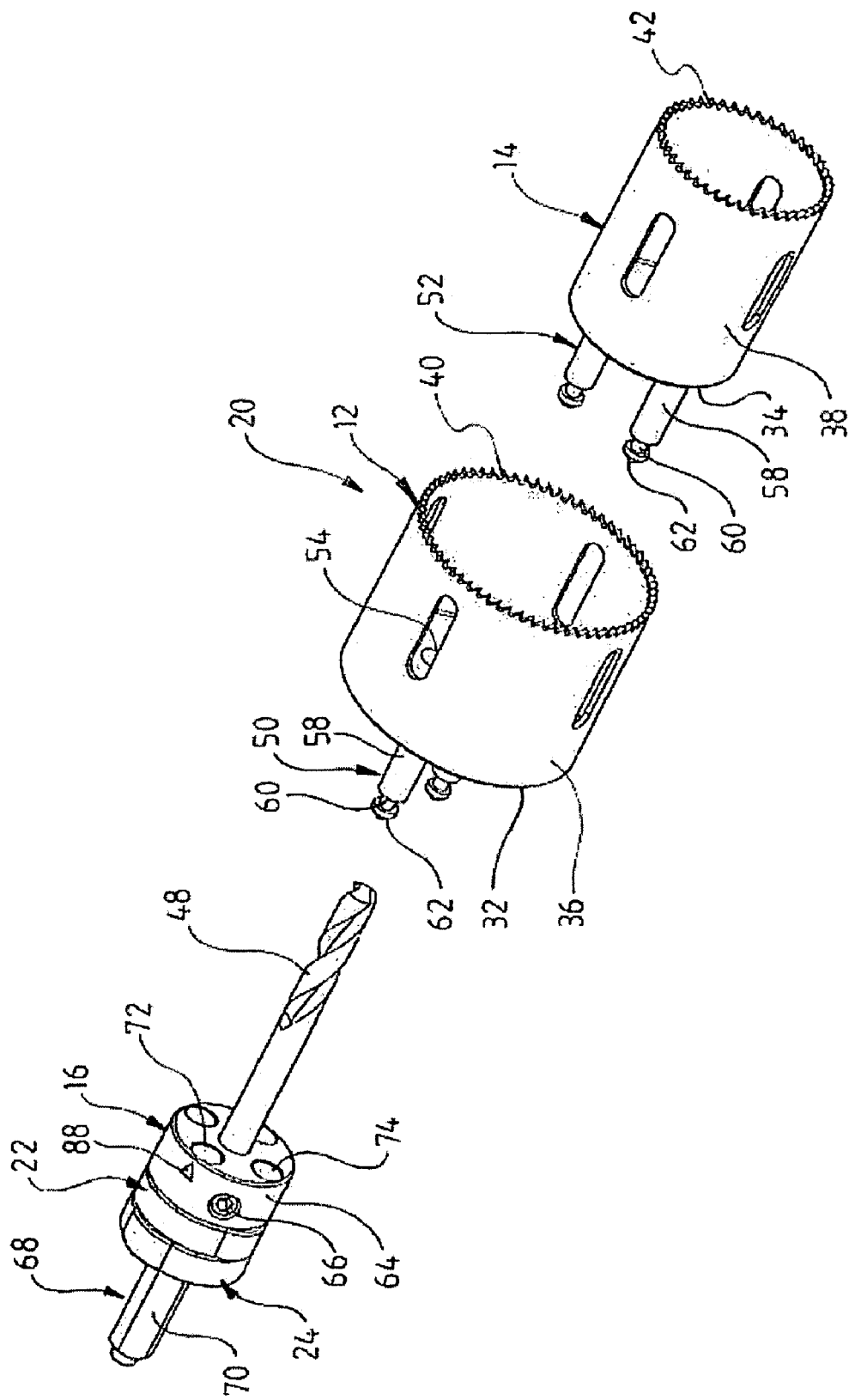
FIG. 2 illustrates an exploded perspective view of a hole-saw assembly in accordance with a second embodiment of the present invention whereby the hole-saw assembly includes two independent annuluses.
Figure 3:
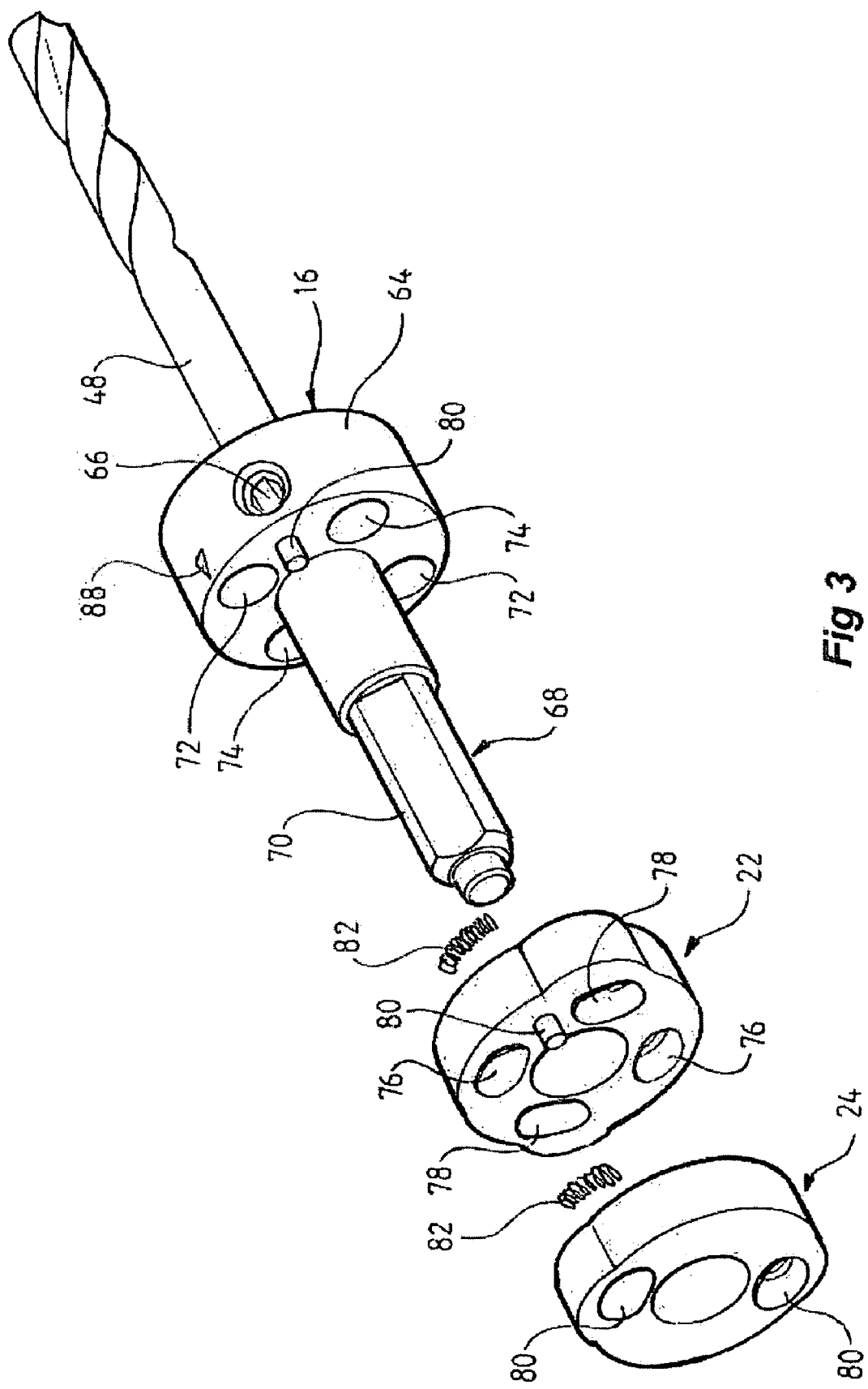
FIG. 3 illustrates an exploded perspective view of the mandrel, pilot drill and annuluses of the hole-saw assembly of FIG. 2.
Figure 4:
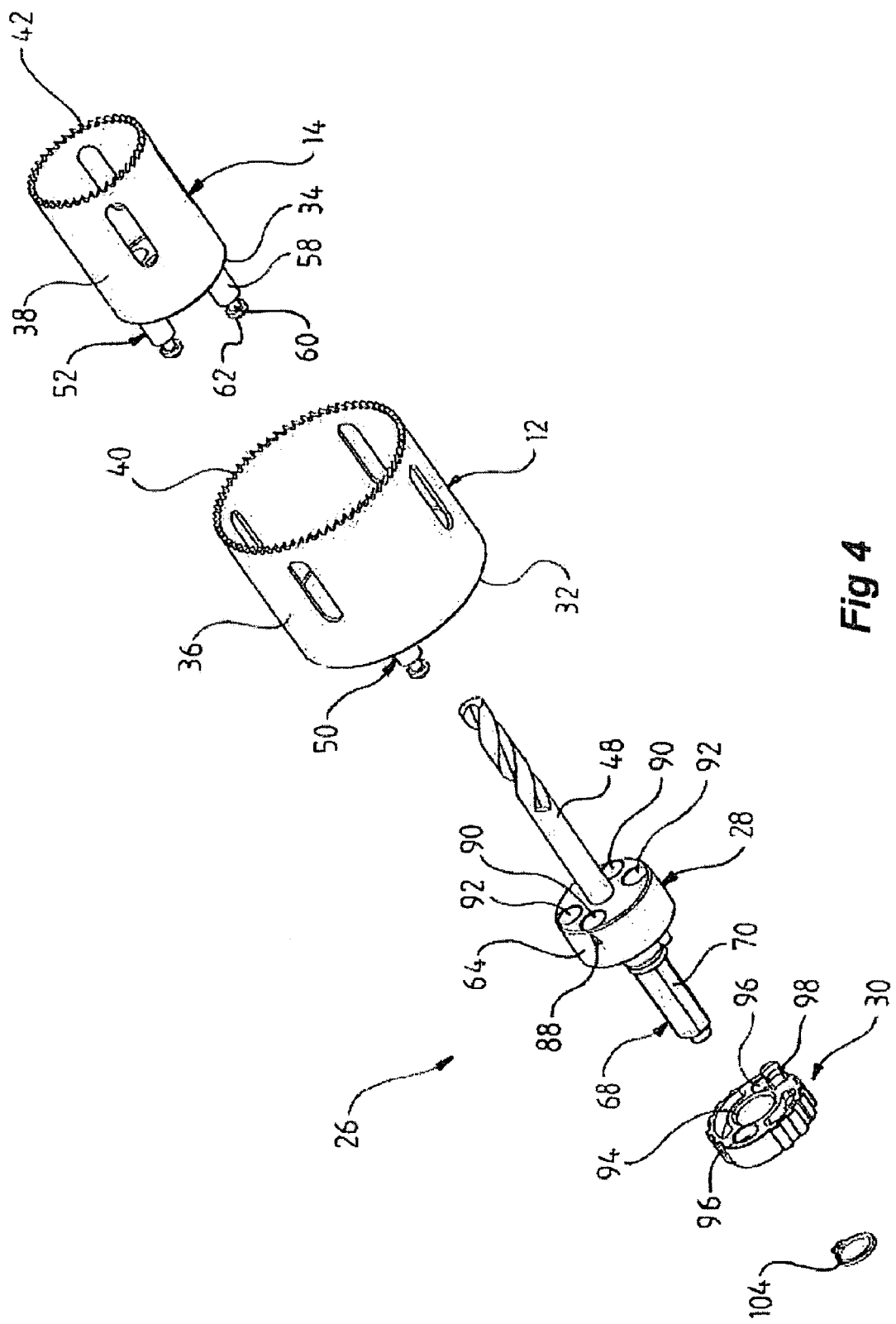
FIG. 4 illustrates an exploded perspective view of a hole-saw assembly in accordance with a third embodiment of the present invention whereby the hole-saw assembly includes a single annulus having a single flute which extends into the mandrel.
Figure 5:
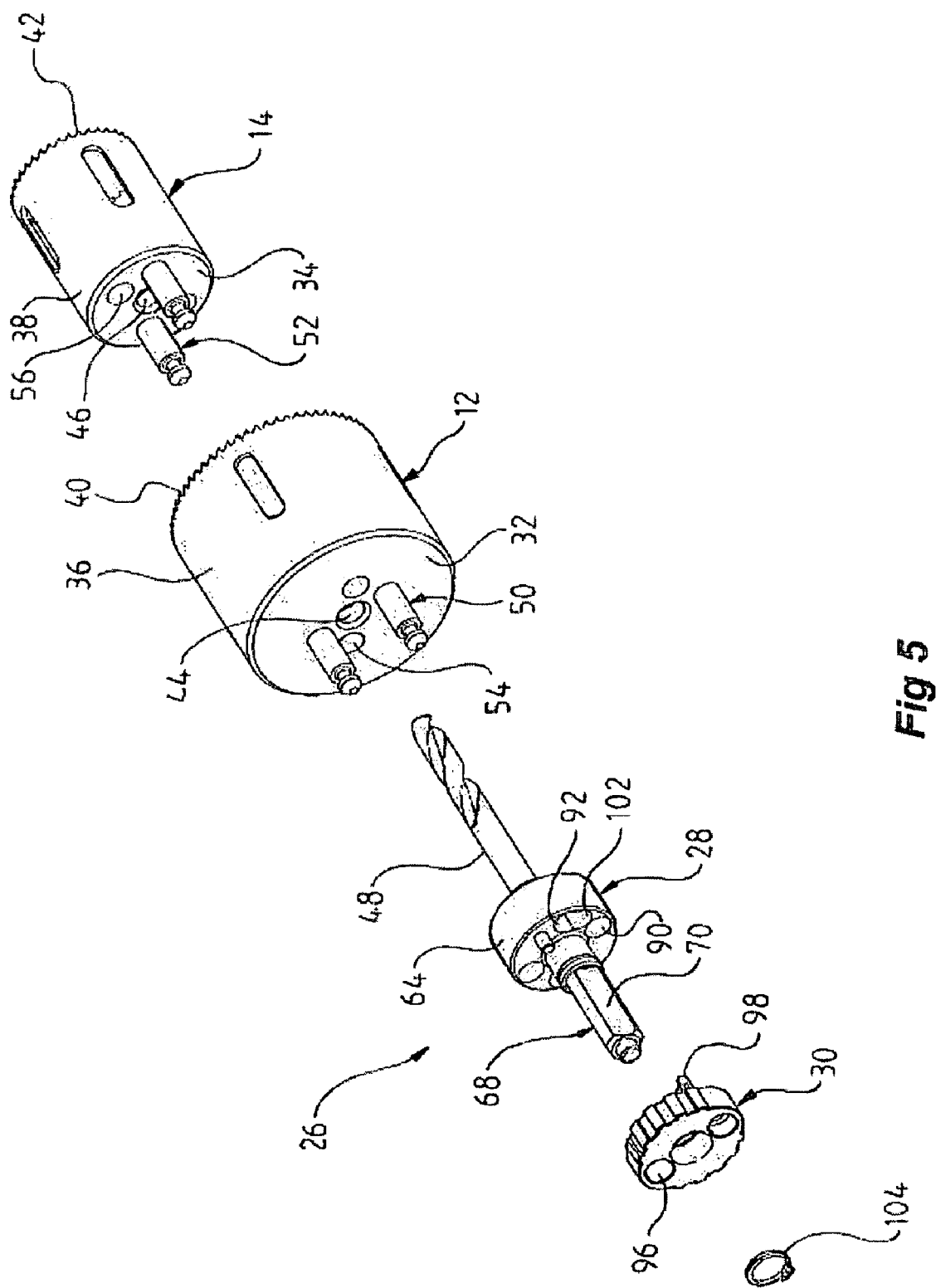
FIG. 5 illustrates an exploded perspective view of the hole-saw assembly of FIG. 4 from an alternate perspective.

FIG. 1 illustrates a hole-saw assembly 10 including a first hole-saw 12, a second hole-saw 14 of lesser diameter, a mandrel 16, and a ring or annulus 18, FIGS. 2–3 illustrate a hole-saw assembly 20 including a first hole-saw 12, a second hole-saw 14, a mandrel 16, and two annuluses 22 and 24, whilst FIGS. 4–10 illustrates a hole-saw assembly 26 including a first hole-saw 12, a second hole-saw 14, a modified mandrel 28, and an annulus 30. Each of these three embodiments involve the two hole-saws 12 and 14 being engageable to mandrel 16/28 only through designated insertion points.

Each of the hole-saws 12 and 14 include respectively a base 32 and 34, longitudinally extending cylindrical bodies 36 and 38, and cutting teeth 40 and 42 at one end thereof. The base 32 and 34 of each hole-saw 12 and 14 include central bores 44 and 46 respectively, through which a pilot drill 48 is adapted to pass. The slight difference between these first two embodiments is described below.

Extending longitudinally outwardly from the bases 32 and 34 of the hole-saws 12 and 14 in an opposite direction to the hole-saw cylindrical bodies 36 and 38 are a pair of identical diametrically opposed drive pins 50 and 52 respectively. Although the diameter of hole-saw 12 is larger than that of hole-saw 14, the spaced apart distance of its drive pins 50 is substantially identical to that of drive pins 52 of hole-saw 14. Because each of the drive pins are identical and operate in the same way, one number has been assigned to each pair. Bases 32 and 34 also include two diametrically opposed apertures 54 and 56 respectively, radially disposed from the drive pin pairs 50 and 52 so that the drive pins of smaller diameter hole-saws may be inserted through base apertures of larger diameter hole-saws and thereby be housed therein.

It is to be understood that the bases 32 and 34 of respective hole-saws 12 and 14 need not be integral with the hole-saws 12 and 14 but may be manufactured as individual parts having the same features as described above, and thus also including a means for connecting the hole-saws thereto. For example, a separate base member (not shown) may consist of a plate having an outwardly extending threaded member for mounting of a hole-saw thereto, and a pair of drive pins extending from the opposing side of the plate.

The drive pins in accordance with the first three embodiments of the present invention comprise cylindrical shafts 58 adjacent the base of each hole-saw 12 and 14 which extend outwardly and terminate into a recessed flute 60 having a chamfered cap 62. The structural configuration of the drive pin pairs 42 and 44 is essential to the way in which the hole-saws engage their respective mandrels.

The mandrel 16/28 of each hole-saw assembly 10, 20 and 26 comprises a substantially cylindrical body 64. The pilot drill bit 48 is adapted to be connected to the mandrel so that it extends from one longitudinal end thereof and may be tightened by way of chuck screw 66, as is well known to those skilled in the art. An arbour 68 extends from the opposed longitudinal end of the mandrel 16/28 having shoulders 70 and is insertable into a drill (not shown) as is also well known in the art.

We now arrive at the way in which the hole-saws 12 and 14 engage with the annuluses, this differing slightly with respect to each embodiment. It is important to understand that throughout the embodiments of the invention, the mechanism for achieving engagement between mandrel and hole-saw is achieved by way of the annuluses. The mechanism for locking each pair of drive pins is essentially the same and therefore, in order to describe the engagement means clearly as well as succinctly, the second embodiment involving two annuluses which independently rotate will be described first, followed by a description of how the first embodiment differs only slightly from the second, and finally a description of the third embodiment involving a single annulus 30 projecting within the mandrel 28.

Thus, referring now to FIG. 2 and FIG. 3, the body 64 of mandrel 16 includes two pairs of diametrically opposed apertures 72 and 74 disposed about a central longitudinal axis along which the pilot drill bit 48 and arbour 68 are aligned. The location and size of the aperture pairs 72 and 74 is such to allow for the insertion and passage through of drive pin pairs 50 and 52 respectively. The length of the mandrel body 64 together with the first annulus 22 is the same length as that of the drive pin shafts 58 of each hole-saw 12 and 14, so that when either of the drive pin pairs 50 or 52 are inserted into the mandrel body 64 through either of the aperture pairs 72 or 74, the recessed flute 60 and chamfered cap 62 protrude beyond the longitudinal end of the first annulus 22.

In the figures, two annuluses 22 and 24 are shown to be coupled to the mandrel body 64 along the same longitudinal axis. Each of the annuluses 22 and 24 is rotatable between a first and a second position. Annulus 22 includes two pairs of diametrically opposed apertures 76 and 78, aperture pair 78 including means to engage a pair of drive pins of a hole-saw 12 or 14. Annulus 24 includes a single pair of diametrically opposed apertures 80 which also include means to engage a pair of drive pins of a hole-saw 12 or 14. The engaging aperture pair 80 of annulus 24 is longitudinally aligned with the non-engaging aperture pair 76 of annulus 22. Thus, aperture pair 76 of annulus 22 is simply included so that drive pin pairs to be engaged in aperture pair 80 may extend therethrough.

A rotational force is required to rotate each annulus to its second position wherein each of the corresponding apertures between mandrel 16 and annulus 22 or 24 become coaxially aligned. When the apertures of an annulus become aligned with the apertures of the mandrel 16, the drive pins 50 or 52 of a hole-saw 12 or 14 are able to be inserted into or withdrawn from the annulus. Each annulus 22 and 24 is biased in its first position, that is, in its misaligned positioned. When the drive pins have been engaged with an annulus, the annulus will have returned to its biased first position, as will become obvious. The way in which each annulus is biased is by way of a simple pin 80 and spring 82 combination which will be explained in greater detail when describing the third embodiment.

Figure 9:
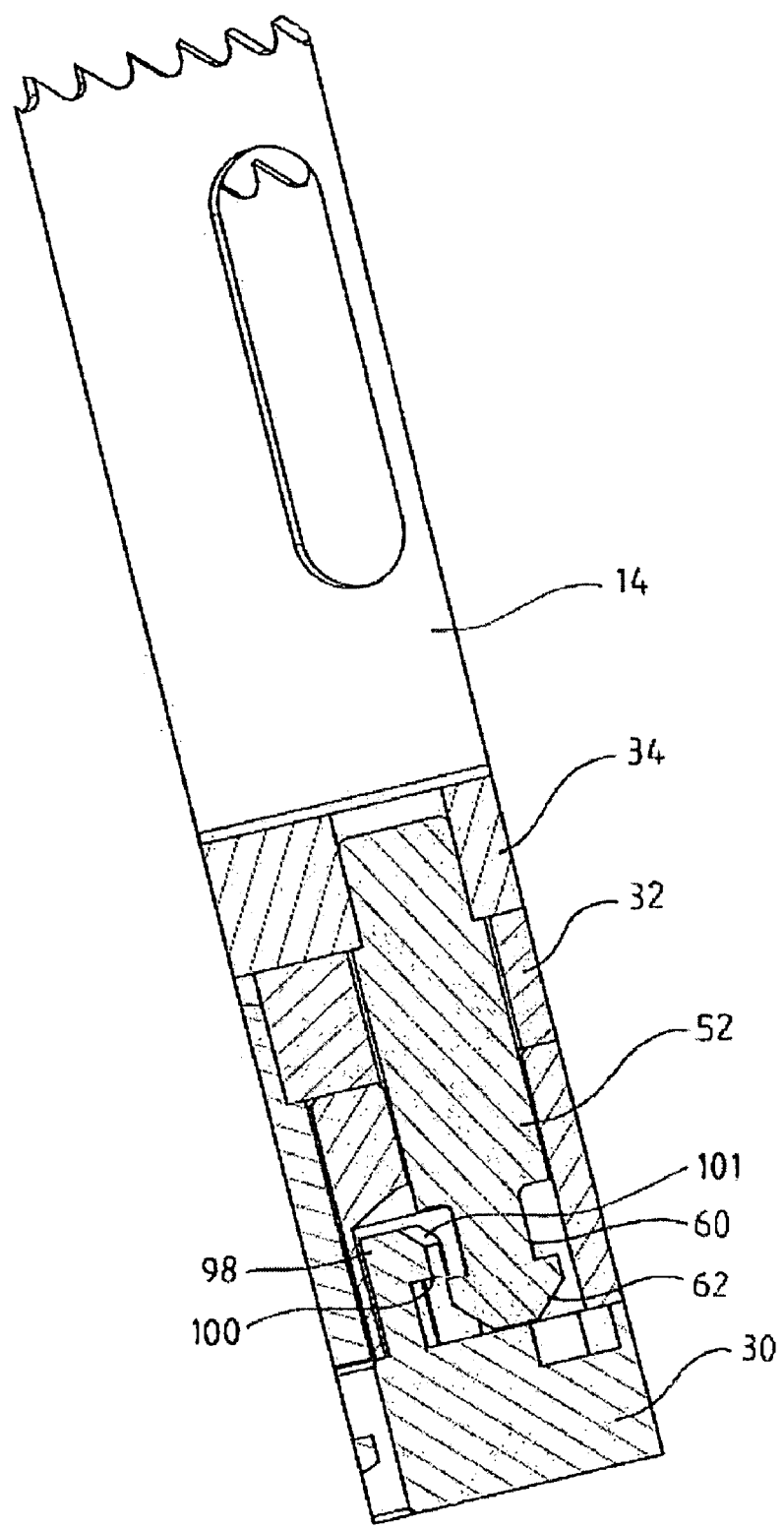
FIG. 9 illustrates a partial cross-sectional view of the locking mechanism between the hole-saw of smaller diameter and the annulus in the assembly of FIGS. 4–5 just prior to engagement of the drive pins with the annulus.
Figure 10:
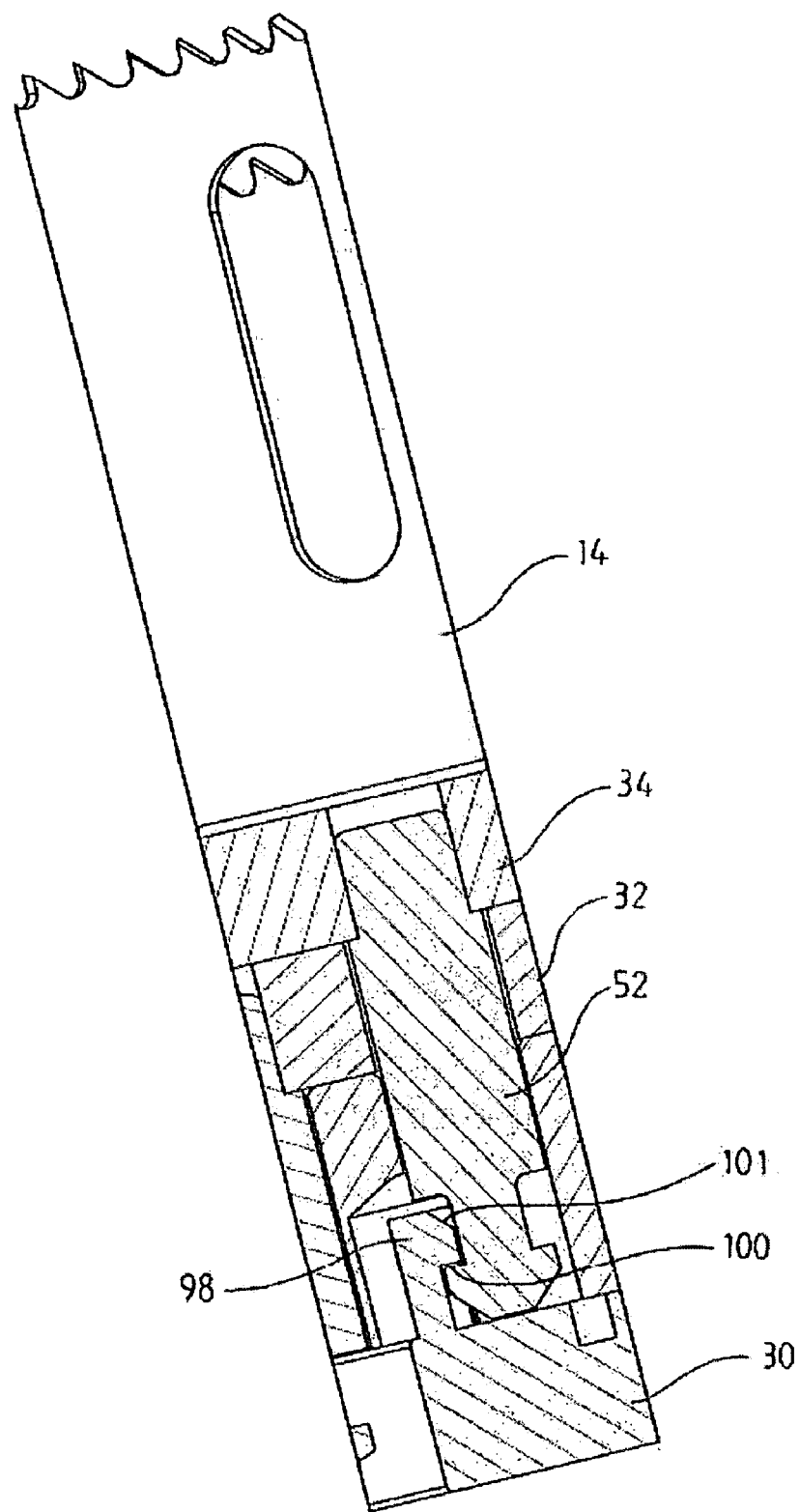
FIG. 10 illustrates a partial cross-sectional view of the locking mechanism between the hole-saw of smaller diameter and the annulus in the assembly of FIGS. 4–5 when the drive pins are engaged with the annulus.

The way in which aperture pairs 78 and 80 of the annuluses engage with corresponding drive pin pairs 50 and 52 of the hole-saws is not shown in the drawings with respect to the first and second embodiments, but can be appreciated when viewing FIGS. 9 and 10 of the third embodiment, FIG. 9 prior to engagement and FIG. 10 engaged. When the chamfered caps 62 of each drive pin pair are inserted into an engaging aperture pair, one or both of the apertures includes a chamfered surface 84 corresponding with the chamfered surface of each cap 62 so that insertion of the drive pins 50 or 52 causes these surfaces to slide and thereby cause the annulus 22 or 24 to rotate from its first position to its second position. The engaging apertures further include a recessed surface 86 adjacent the chamfered surface 84 such that when the annulus is in the second position and the drive pins able to be inserted further, the annulus is biased back to the first position thereby causing the chamfered cap 62 to engage the recessed surface 86. This effectively prevents the drive pins from being withdrawn from the annulus, unless of course the annulus is manually rotated back to the second position. The chamfered surface 84 need not be chamfered and may very well be straight, it simply provides the tool operator with a smoother "snap-fit" connection. The rotation from the biased first position to the second position is generally in the same direction as the rotation of the drill.

It should now be understood that the annulus in each embodiment of the present invention is required to be rotated to effect longitudinal movement of the hole-saws. For example, when inserting a hole-saw, the annulus will move with the force of the insertion and when withdrawing a hole-saw, the annulus must be manually rotated.

There is a marking 88 on the mandrel 16 aligned with aperture pair 72 to ensure that when inserting a base hole-saw, that is a hole-saw adapted to be locked adjacent the mandrel, it is inserted into an aperture pair which is lockable in the second annulus 24. If one were to insert a base hole-saw into aperture pair 74, the hole-saw will be incorrectly engaged in the first annulus 22. Those skilled in the art will appreciate that during insertion of the first hole-saw 12 of larger diameter into the mandrel 16, the cap 62 and flute 60 travel through apertures 76 and engage with annulus 24. The apertures 76 are also shaped so that when annulus 22 is rotated, they do not interfere with the drive pins 50 of the hole-saw 12 once inserted. When fully inserted into the mandrel 16, the caps 62 of the hole-saw 12 extend to a position aligned with the surface plane of the second annulus 24, while caps 62 of the hole-saw 14 extend to a position aligned with the surface plane between the first and second annuluses 22 and 24.

The function of the apertures 54 and 56 of the hole-saws 12 and 14 respectively should now be apparent, to allow for the simultaneous assembly of two hole-saws 12 and 14. Therefore, when the second hole-saw 14 is required to be mounted to the mandrel 16, the drive pins 52 are firstly inserted into apertures 54 of the first hole-saw 12 and through the corresponding apertures of the mandrel 16. As the length of the drive pins 50 of the second hole-saw 14 are equal to the lengths of the drive pins 52 of the first hole-saw 12, it becomes obvious that the drive pins 52 are unable to extend through to the second annulus 24 and thus engage the first annulus 22. As mentioned earlier, it is to be understood that although in some situations the drive pins may be locked by a pair of engaging apertures, one engaging aperture will suffice to adequately secure the hole-saw to the assembly.

The skilled addressee will now appreciate that the hole-saw assembly 20 according to a second embodiment of the invention enables for the very quick mounting and demounting of hole-saws of different diameter to a mandrel 16 that is already mounted in a drill.

Referring back now to FIG. 1 and hole-saw assembly 10 which includes only a single annulus 18 according to a first and broadest aspect of the invention. The single annulus 18 comprises two adjacent locking mechanisms almost identical to that of the second embodiment, except the locking mechanisms are not rotatable independently of the other. This mechanism will not be explained in any great detail, but it is important to note that in having two locking mechanisms in an integral unit such as annulus 18 means that each locking means moves from the first to the second position simultaneously. This means that if hole-saw 12 is engaged within the second locking mechanism within the annulus 18, then when the second hole-saw is inserted, the entire annulus 18 will be forced to rotate and hence allow the first hole-saw to fall out. Thus, assembly and disassembly of the hole-saws would need to be undertaken with the aid of gravity, that is, the drive pins would need to be inserted in a direction toward the ground.

FIGS. 4–10 illustrate the third embodiment of the present invention, and more specifically a hole-saw assembly 26 including a single annulus 30, once again moveable between a first biased position and a second position, and being capable of easily and quickly locking two hole-saws 12 and 14 simultaneously to its mandrel 28. The mandrel includes diametrically opposed aperture pairs 90 and 92, and the annulus 30 includes a central bore 94 and aperture pairs 96 co-axially aligned with mandrel apertures 90 when the annulus 30 is in the second position, and misaligned when the annulus 30 is in the first position as in previous embodiments. Adjacent one of the apertures 96 is a locking member 98 which projects longitudinally outwards from the annulus 30 into within the mandrel 28. The locking member 98 is fixed to its surface and includes a lip 100 and an upper chamfered surface 101 whose rounded perimeter is axially aligned with the perimeter of one of the apertures of aperture pair 90 in mandrel 96. As described below, the locking member 98 acts as a first locking mechanism whilst the primary portion of the annulus acts as the second locking mechanism.

Figure 6:
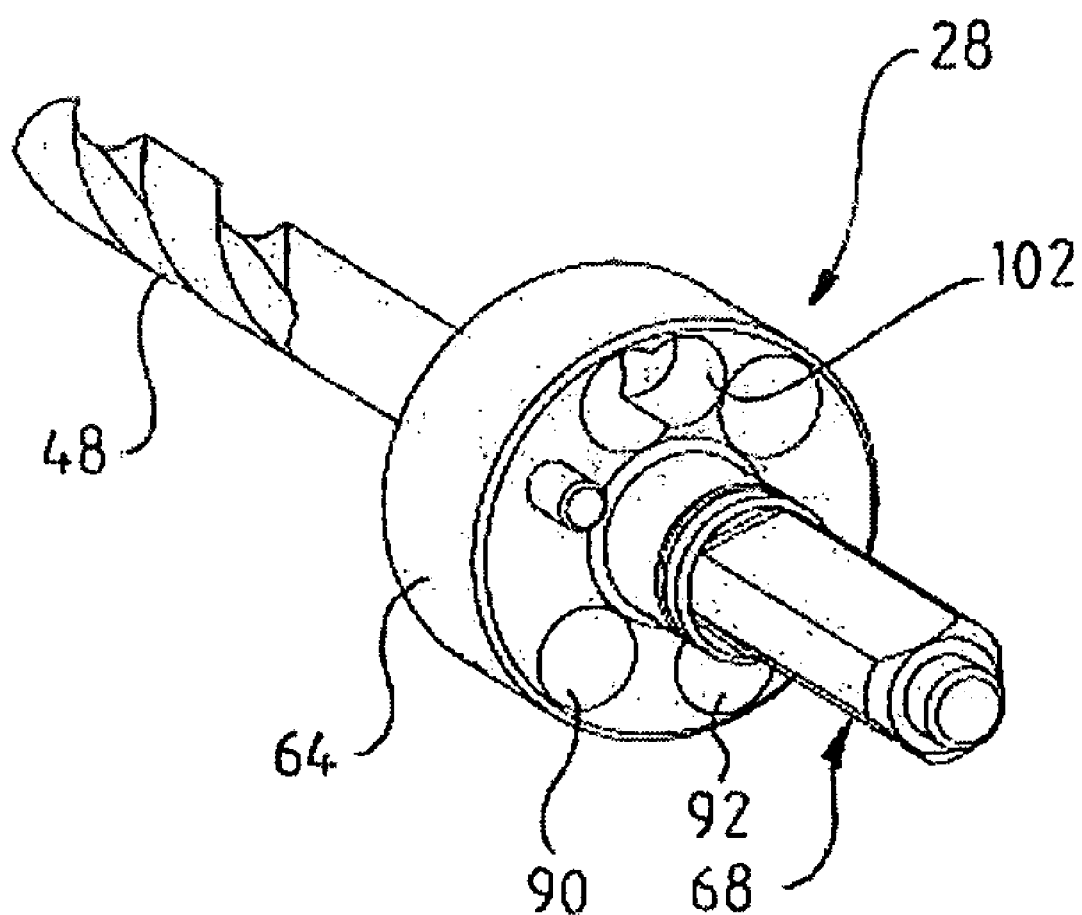
FIG. 6 illustrates a perspective view from the underside of the mandrel and pilot drill of FIGS. 4–5.

It is to be understood that once assembled, locking member 98 is housed within a recess 102 of the modified mandrel 28 which can be seen clearly in FIG. 6. The mandrel 28 is modified from the first two embodiments to allow for the locking member 98 to be housed and further for the locking member 98 to be capable of rotation during locking. This is achieved with the inclusion of recess 102 positioned adjacent to and connecting with the aperture 90 in which the locking member 98 is located. The annulus 30 is secured to the mandrel using a circlip 104.

When the first hole-saw 12 of larger diameter is mounted to the mandrel 28, the chamfered caps 62 and flutes 60 extend into the annulus 30 when it is aligned with the body, and engage the locking mechanism in the same way as described in the earlier embodiments. When the second hole-saw 14 is mounted to the mandrel 28, the caps 62 and flutes 60 of one drive pin of the drive pin pair 52 engage the locking member 98, that is, once again the chamfered cap 62 slides against the chamfered edge 101 of the locking member 98. Upon engagement, the annulus 30 snaps back into its first position, the lip 100 of the locking member 98 engaging with the chamfered cap 62 of the drive pin. This effectively prevents the drive pins 52 from being withdrawn from the mandrel 28. Therefore, instead of the need and subsequent manufacturing cost of two annuluses 22 and 24, single annulus 30 may provide the same engagement. A further advantage is provided in that because the locking member 98 extends within the mandrel 28, less space is consumed.

Figure 7:
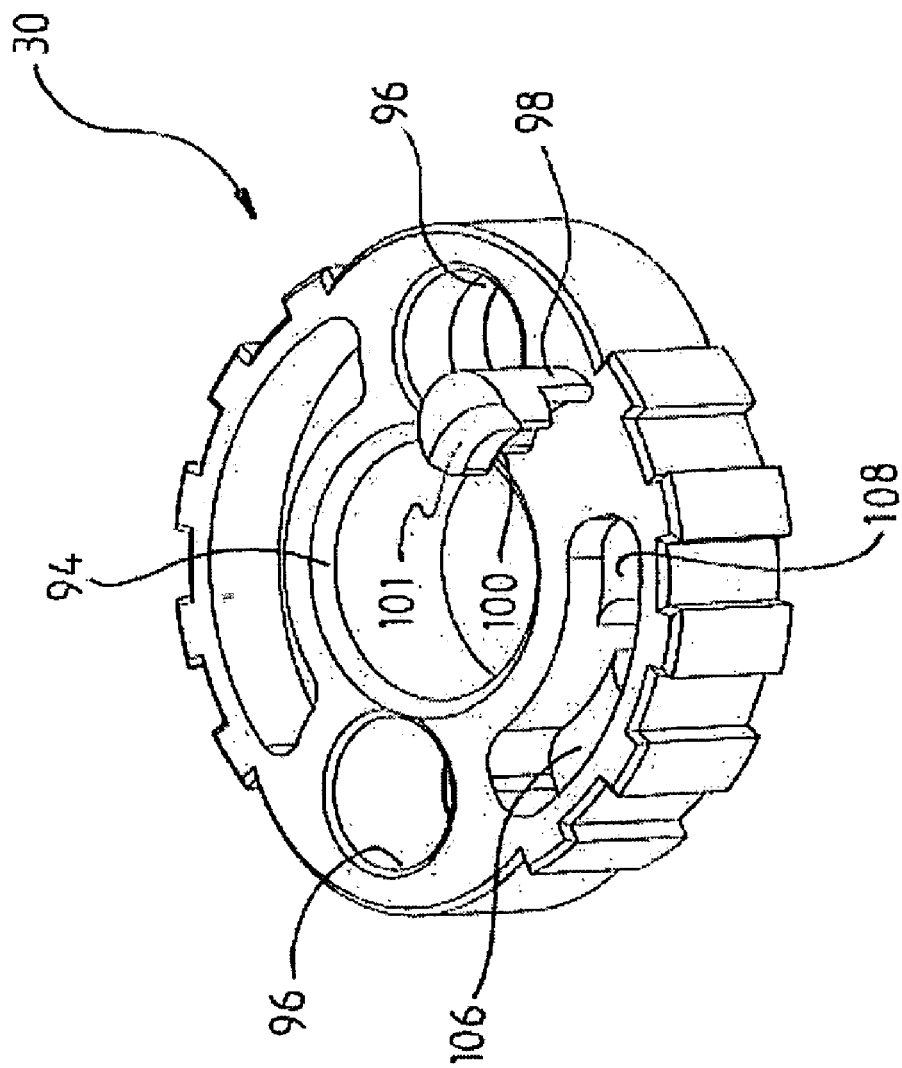
FIG. 7 illustrates an enlarged perspective view of the annulus of the hole-saw assembly of FIGS. 4–5.
Figure 8:
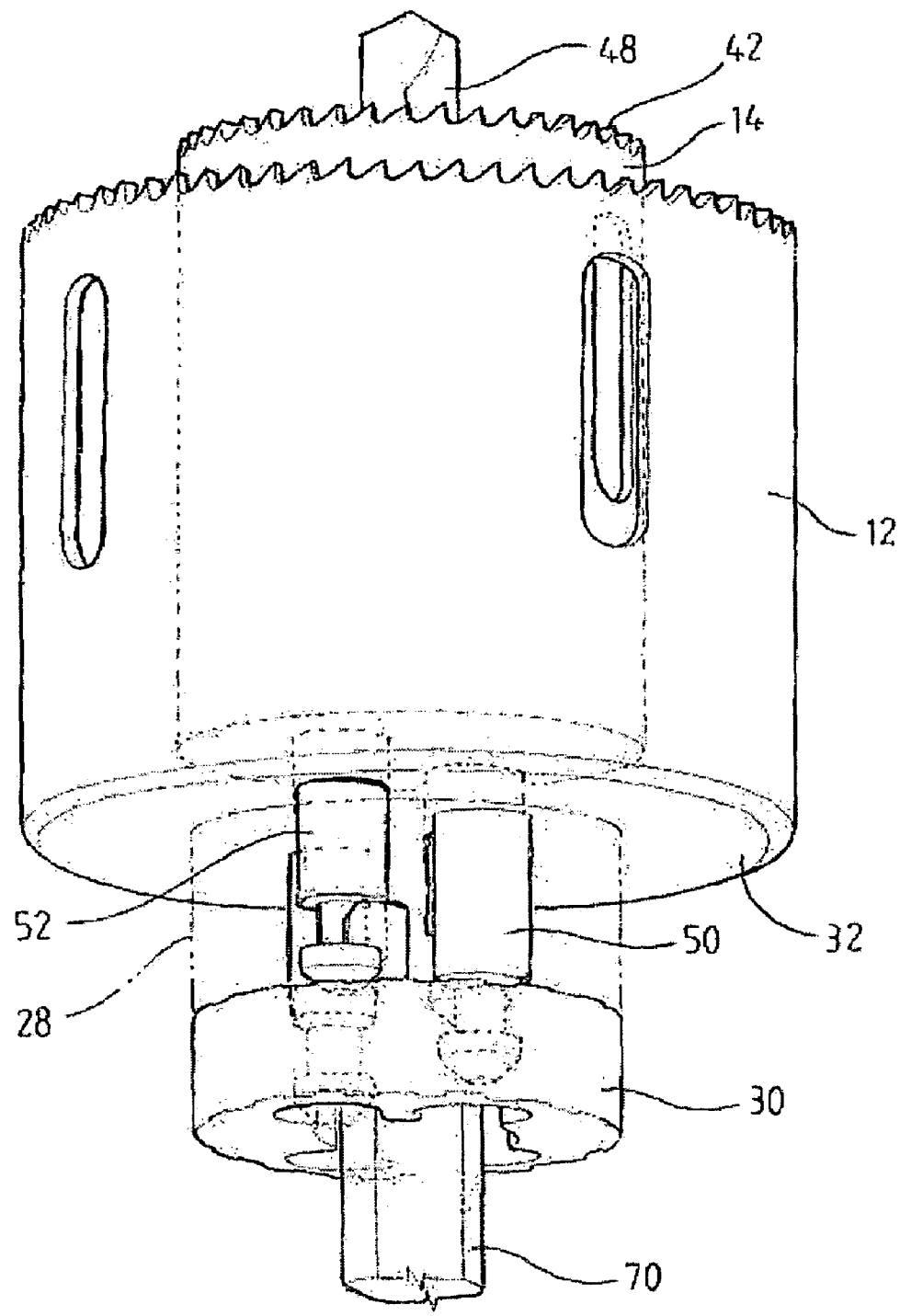
FIG. 8 illustrates a detailed perspective view of the locking mechanism between two hole-saws and the annulus of the hole-saw assembly of FIGS. 4–5.

The biasing arrangement, which applies to all three of the above embodiments (and later embodiments) can be seen clearly in FIG. 7. The annulus 30 includes a groove 106 within which is located the biasing means, typically a spring 82. At one end of the groove is located a channel 108 within which slidably moves a pin 80 that is fixedly attached to the mandrel 28. During assembly, the pin 80 is adapted to be located within the channel under the influence of the biasing means 82. The length of the channel 108 within which the pin 80 can effectively move, then limits rotation of the annulus 30. It is to be understood that in relation to the first and second embodiments involving annuluses 22 and 24, the second annulus 24 is moveable in the same way as described above with the pin 80 extending from the first annulus rather than from the mandrel 16.

A problem with the above three embodiments is the fact that one must identify which aperture pair the first hole-saw should be inserted, for example, by marker 88 which is aligned with the aperture pair to which the second locking mechanism applies. This problem is overcome according to a fourth and fifth embodiment of the present invention.

Figure 11:
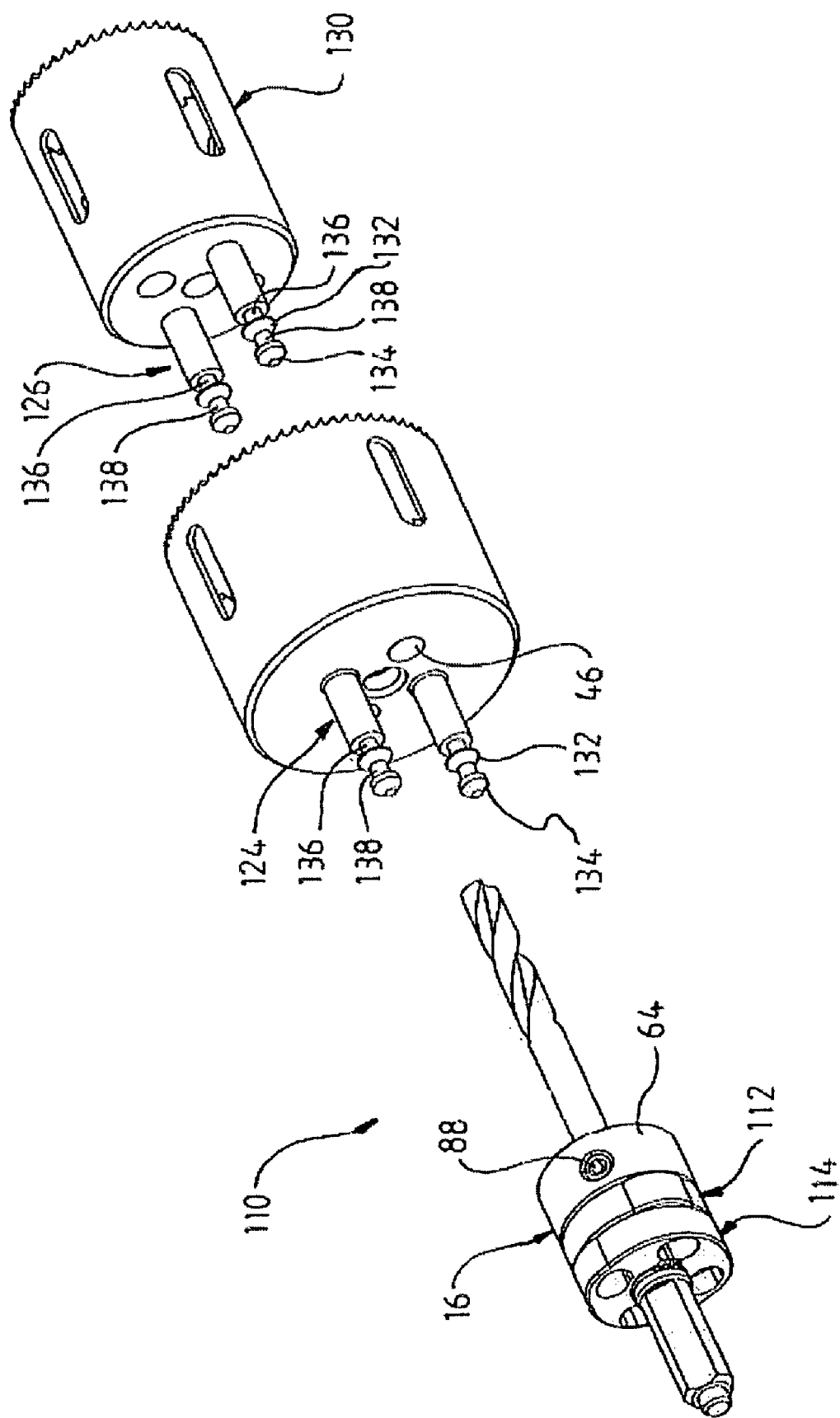
FIG. 11 illustrates an exploded perspective view of a hole-saw assembly in accordance with a fourth embodiment of the present invention whereby the hole-saw assembly includes two independent annuluses.
Figure 12:
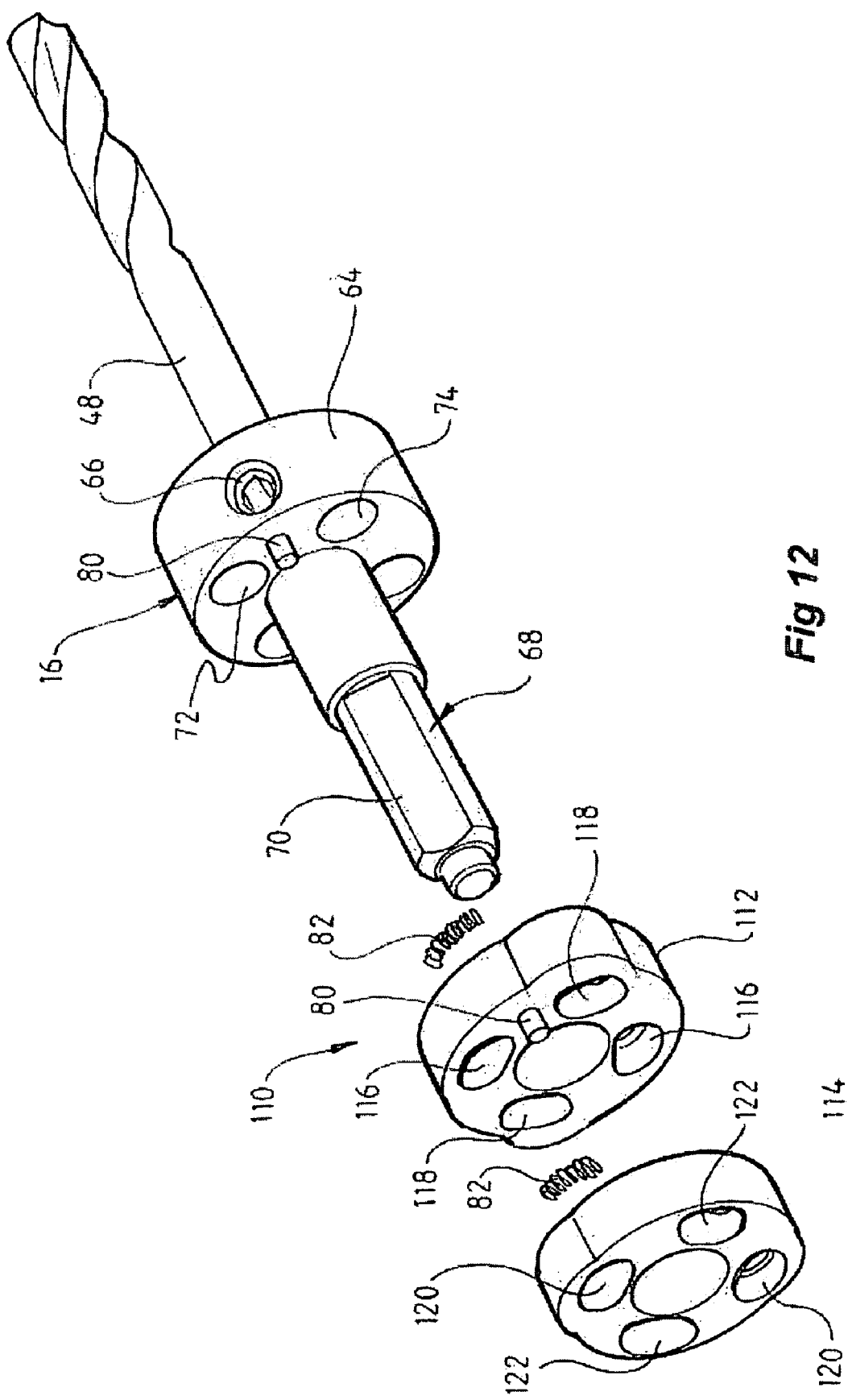
FIG. 12 illustrates an exploded perspective view of the mandrel, pilot drill and annuluses of the hole-saw assembly of FIG. 12.
Figure 13:
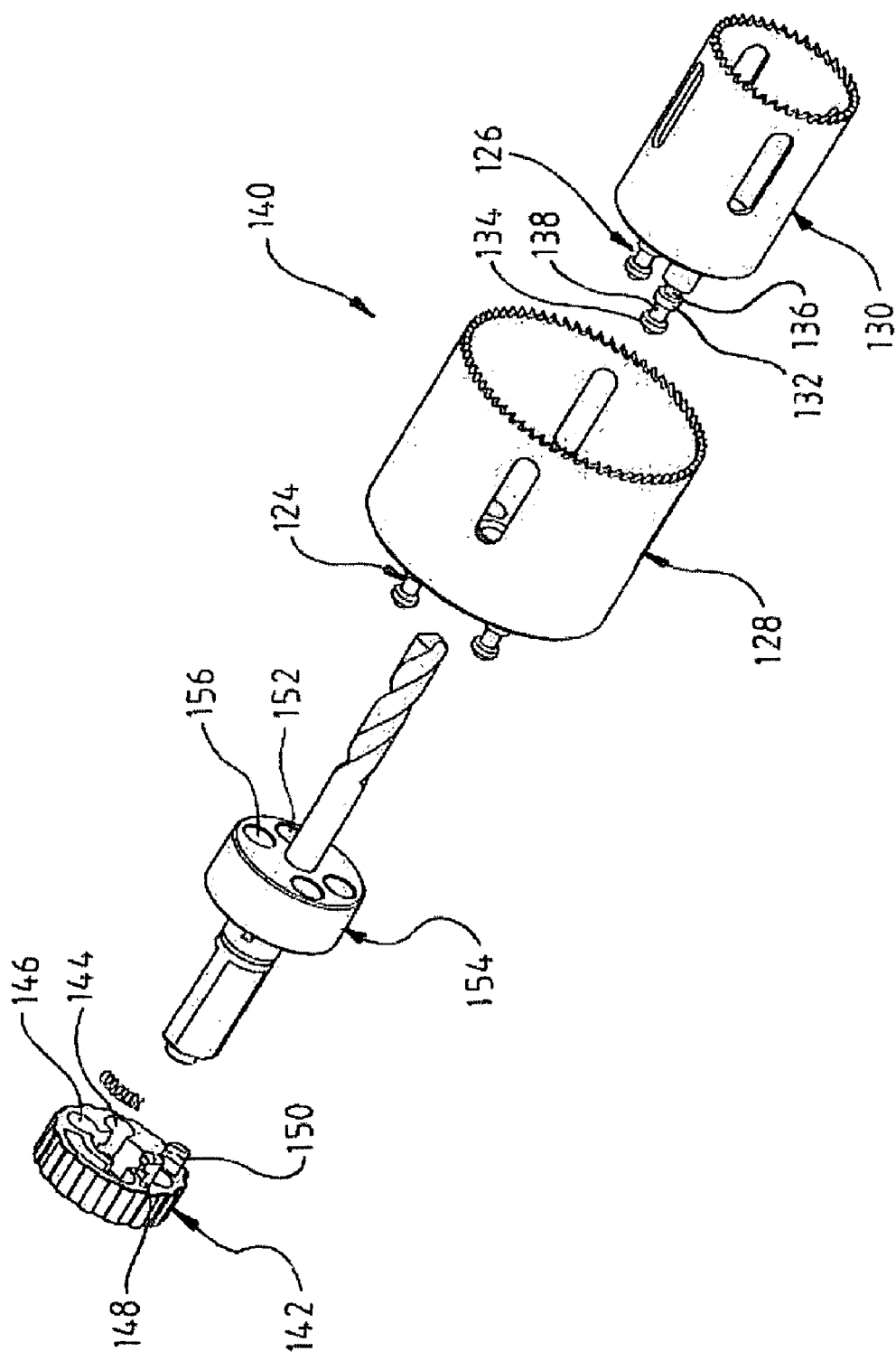
FIG. 13 illustrates an exploded perspective view of a hole-saw assembly in accordance with a fifth embodiment of the present invention whereby the hole-saw assembly includes a single annulus having two flutes which extend into the mandrel.
Figure 14:
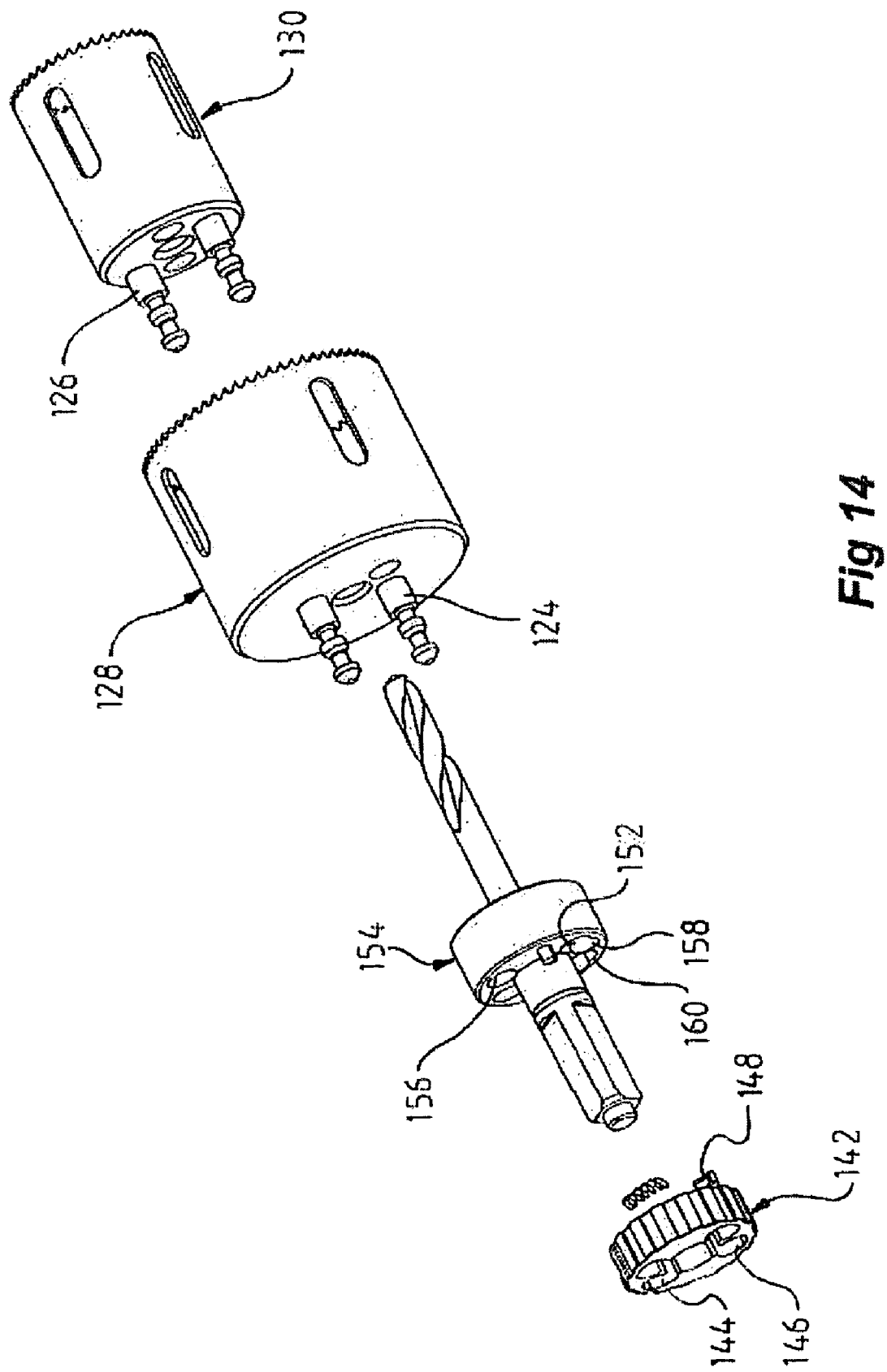
FIG. 14 illustrates an explode perspective view of the hole-saw assembly of FIG. 14 from an alternate perspective.
Figure 15A:
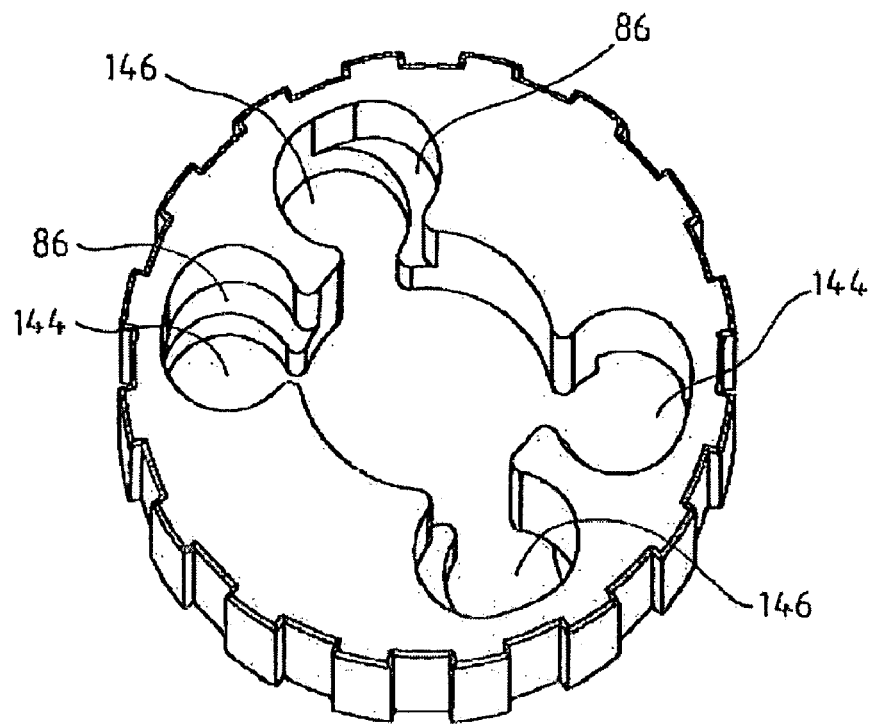
FIG. 15a illustrates an enlarged perspective view of the underside of the annulus of the hole-saw assembly of FIGS. 14–15.
Figure 15B:
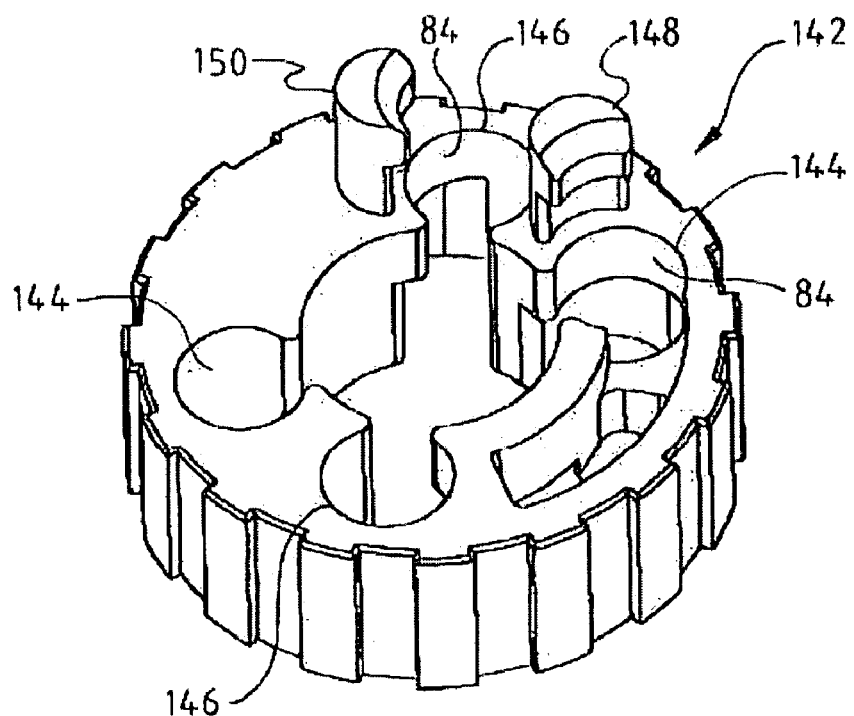
FIG. 15b illustrates an enlarged perspective view of the upper side of the annulus of the hole-saw assembly of FIGS. 14–15.
Figure 16:
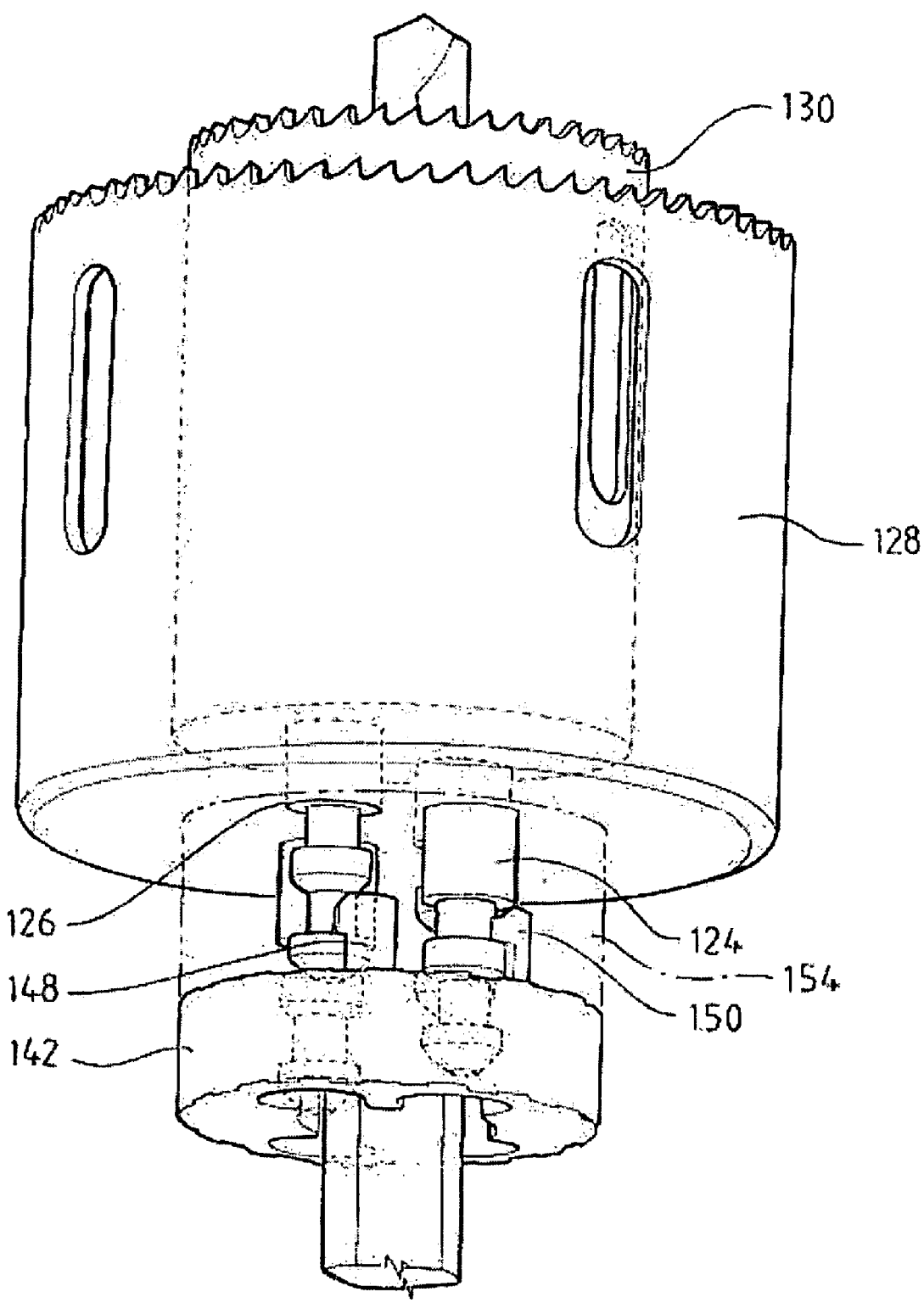
FIG. 16 illustrates a detailed perspective view of the locking mechanism between two hole-saws and the annulus of the hole-saw assemblies of FIGS. 14–15.
Figure 17:
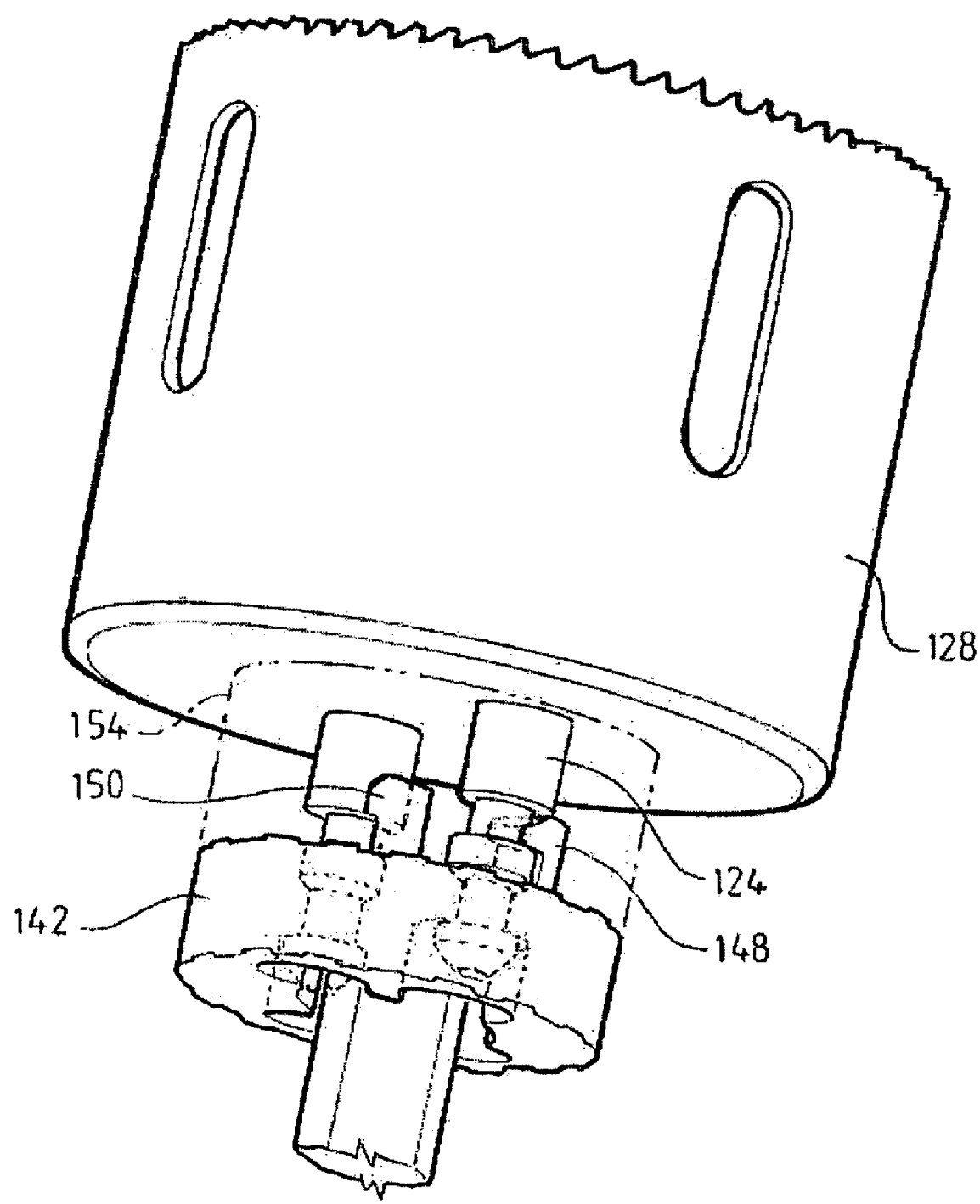
FIG. 17 illustrates a detailed perspective view of the locking mechanism between the hole-saw of larger diameter and the annulus of the hole-saw assembly of FIGS. 14–15.
Figure 18:
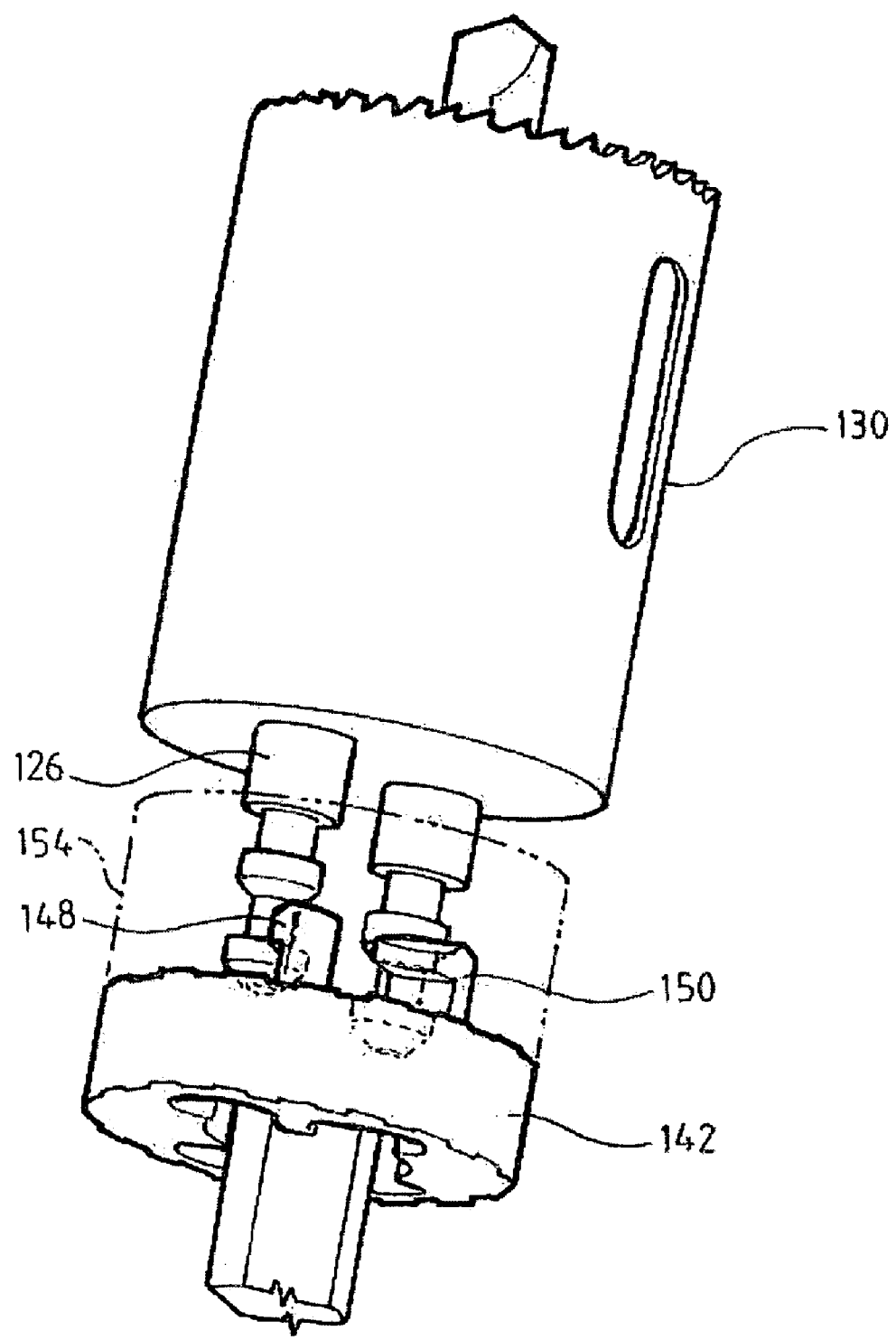
FIG. 18 illustrates a detailed perspective view of the locking mechanism between the hole-saw of smaller diameter and the annulus of the hole-saw assembly of FIGS. 14–15.
Figure 20:
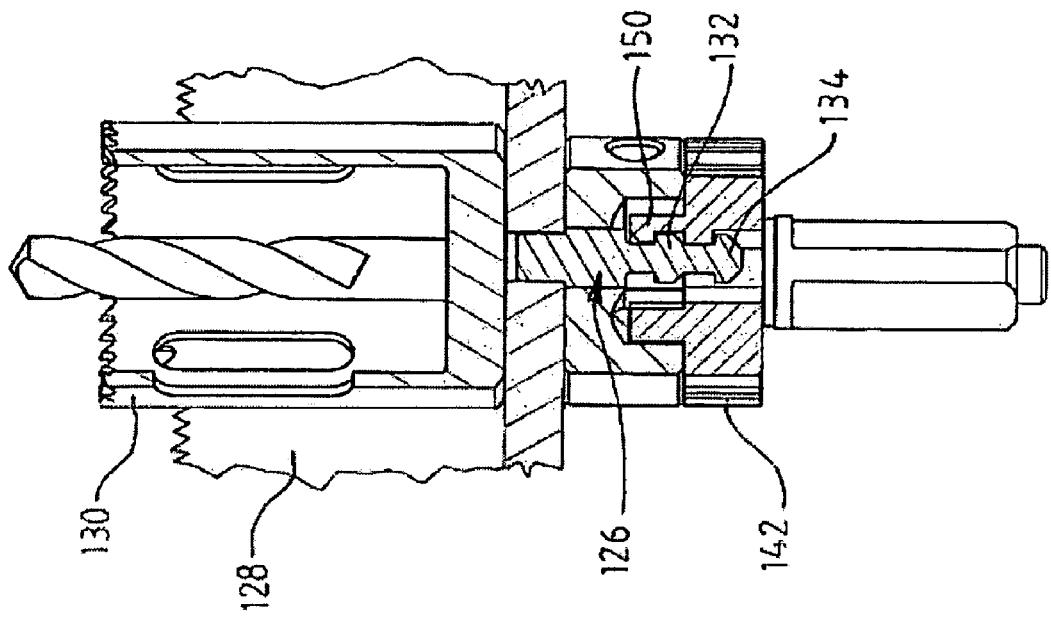
FIG. 20 illustrates a partial cross-sectional view of a hole-saw drive pin engaged within both the annulus and the annulus flute of the hole-saw assembly of FIGS. 14–15.
Figure 19:
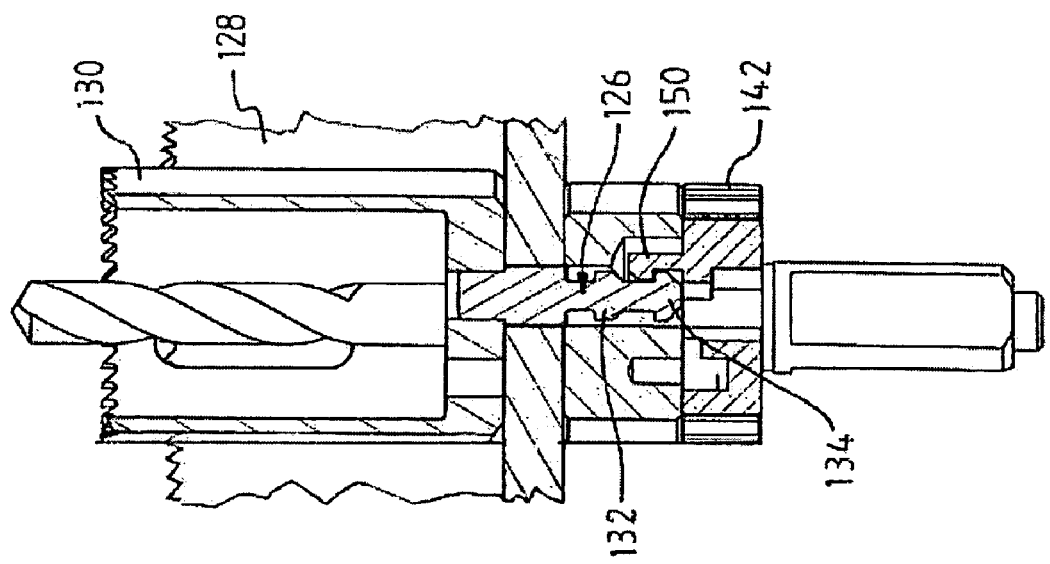
FIG. 19 illustrates a partial cross-sectional view of a hole-saw drive pin engaged within one of the annulus flutes of the hole-saw assembly of FIGS. 14–15.

FIGS. 11 and 12 illustrate a hole-saw assembly 110 including a mandrel 16 and a double annulus configuration similar to that of the second embodiment. The first and second annuluses 112 and 114 however each include two pairs of engaging apertures, that is, annulus 112 includes engaging aperture pair 116 and 118 whilst annulus 114 includes engaging aperture pair 120 and 122. Further, each of the drive pins of drive pin pairs 124 and 126 of hole-saws 128 and 130 respectively include a first 132 and a second 134 chamfered cap. In this embodiment, the length of the mandrel body 64 is the same length as that of the drive pin columns 136, so that when either of the drive pin pairs 124 or 126 are inserted into the mandrel body 64, the first and second chamfered caps 132 and 134 together with their corresponding recessed flutes 136 and 138 protrude beyond the body 64.

As the skilled addressee would realise, this fourth embodiment allows for either hole-saw 128 or 130 to be inserted into either aperture pair 72 or 74 of mandrel 16 without having to be concerned about which aperture pair of the annuluses 112 or 114 is the engaging aperture pair, as in this case each of the aperture pairs are engaging. Again, only a single aperture in each diametrically opposed pair of each annulus need be engageable. This configuration provides obvious benefits insofar as ease of assembly is concerned, however, it also increases the cost of material and tooling.

Similarly, the fifth embodiment of the present invention is an extension of the third embodiment and this hole-saw assembly 140 can be seen in FIGS. 13–20. A single annulus 142 includes two diametrically opposed aperture pairs 144 and 146, and two locking members 148 and 150 projecting longitudinally outwardly therefrom adjacent the opposed aperture pairs 144 and 146 respectively. Thus, those skilled in the art would realise straight away that the annulus 142 includes a further locking member and further aperture pair to be able to engage double-chamfered drive pins by insertion through any of the aperture pairs.

The locking members 148 and 150 are aligned such that the rounded lip of the locking member 148 is aligned with the perimeter of one aperture of opposed aperture pair 152 of the modified mandrel 154, and the other locking member 150 is aligned with the perimeter of one aperture of opposed aperture pair 156. The mandrel 154 is further modified in this case to include two recesses 158 and 160 forming part of one of the apertures in aperture pairs 152 and 156 respectively. As in the previous embodiment, the recesses 158 and 160 house locking members 148 and 150 respectively and allow for their rotation therein. As can be seen, this embodiment also involves the use of double chamfered hole-saws 128 and 130.

Thus, when the first hole-saw 128 of larger diameter is mounted to the mandrel 154, the second chamfered cap 134 and flute 138 initially engage with a first locking member 148 or 150, depending on the aperture pair in which it is inserted. Upon further insertion, the second chamfered cap 134 and flute 138 extend into the annulus 142 at the same instance that the first chamfered cap 132 and flute 136 engage with the same locking member 148 or 150. The same applies when the second hole-saw 130 is inserted in the remaining opposed aperture pair.

Again, those skilled in the art would realise that one could insert the drive pins 124 of a first hole-saw 128 or 130 into any one of the opposing pair of apertures 152 or 156 in the mandrel 154 to successfully engage the annulus 142. The two locking members 148 and 150 allow for this, and this also exemplifies the fact that there need only be one engaging aperture to each opposed pair.

It should be understood that some of the Figures include annuluses having a central bore that extends into each of the diametrically opposed aperture pairs, and others that include aperture pairs separate from the central bore. Both of these configurations are viable options.

Illustrated in FIG. 21 is a further aspect of the invention. The hole-saw assembly 162 includes the same components present in the third embodiment of the invention except now including a cylindrical sleeve 164 adapted to enclose both the annulus 30 and mandrel 28. More specifically, the annulus is adapted to be fixed within the base of the sleeve 164 by way of a friction fit for example, whilst the sleeve is configured to be rotatable about the mandrel 28. This may be achieved by the use of a spring and ball bearing combination (not shown) between the inner surface of the sleeve 164 and the outer surface of the mandrel 28. This thus allows for the manual rotation of the annulus by simply gripping the sleeve to thus disconnect a hole-saw therefrom. The sleeve provides an aesthetically pleasing finish to the hole-saw assembly and also provides a larger surface area to grip onto whilst rotating the annulus, hence the cross-hatched gripping surface 166.

A problem that has been encountered in using the hole-saw assemblies of the present invention has been that once the hole-saws are engaged to the annulus, they tend to be able to move slightly in the longitudinal direction, this movement colloquially known as 'slop'. FIGS. 22, 23A–23C and 24A–24C illustrate a way in which this movement of the hole-saw relative to the annulus and mandrel may be prevented and applied to any of the embodiments described herein. As an example, the configuration of hole-saw assembly 162 including a sleeve 164 shall be used. Some components of the assembly which are not relevant to the way in which this problem is overcome have not been included in the illustrations, for example locking member 98.

Figure 23A:
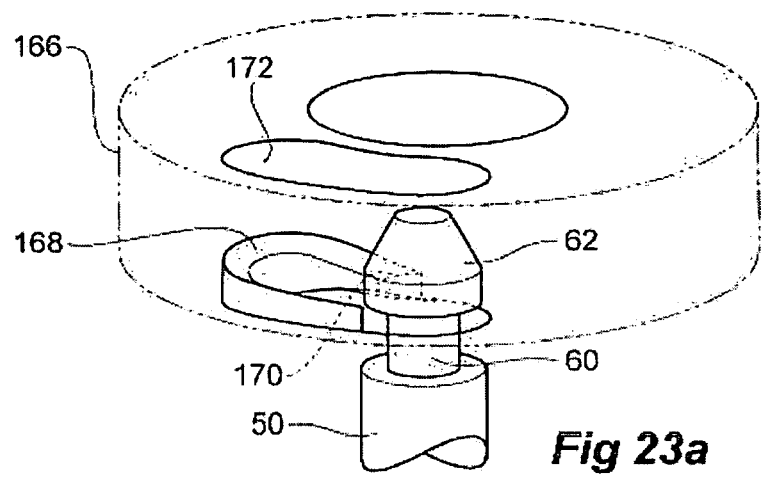
FIG. 23A illustrates an enlarged perspective view of a pair of hole-saw drive pins just prior to engagement with an annulus having a ramped engagement lip.
Figure 23B:
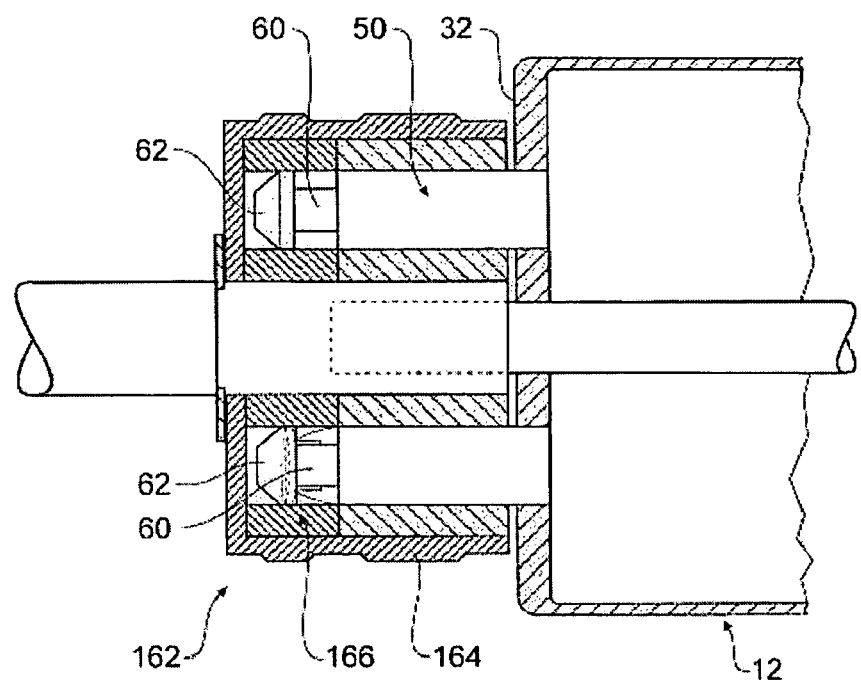
FIG. 23B illustrates a side partial cross-sectional view of FIG. 22A.
Figure 23C:
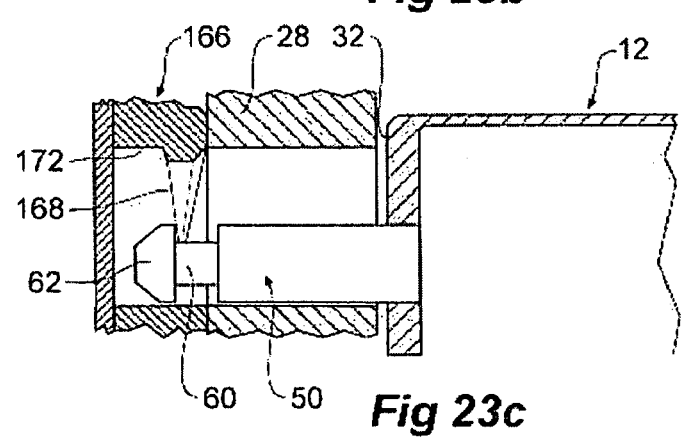
FIG. 23C illustrates a front partial cross-sectional view of FIG. 22A.
Figure 24A:
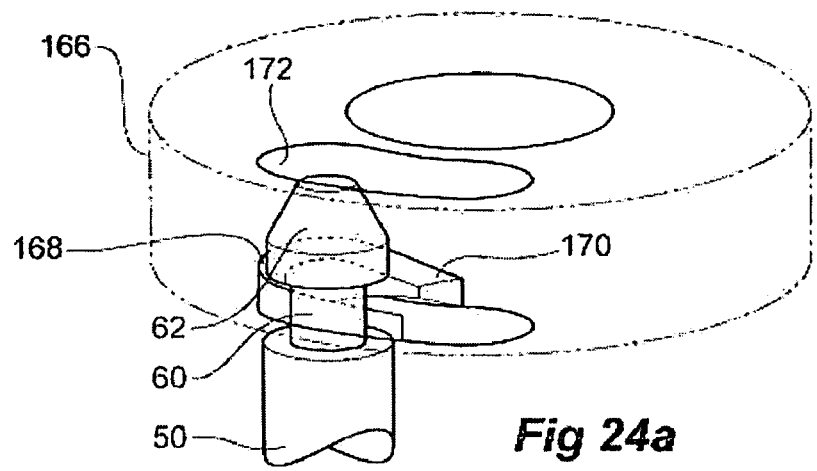
FIG. 24A illustrates an enlarged perspective view of a pair of hole-saw drive pins when engaged with an annulus having a ramped engagement lip.
Figure 24B:
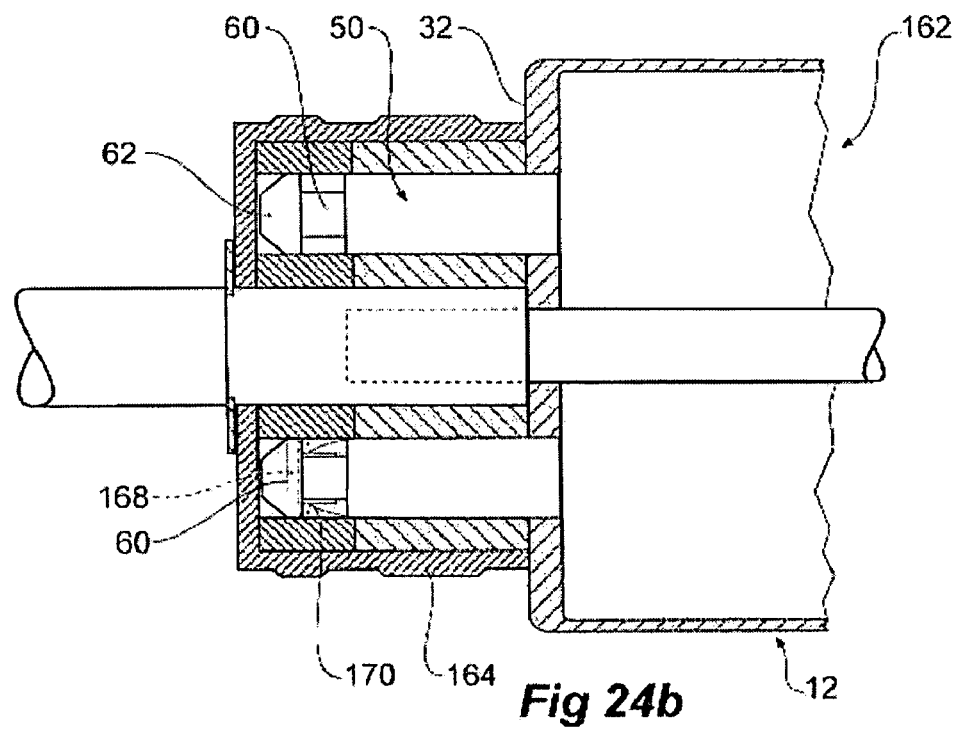
FIG. 24B illustrates a side partial cross-sectional view of FIG. 23A.
Figure 24C:
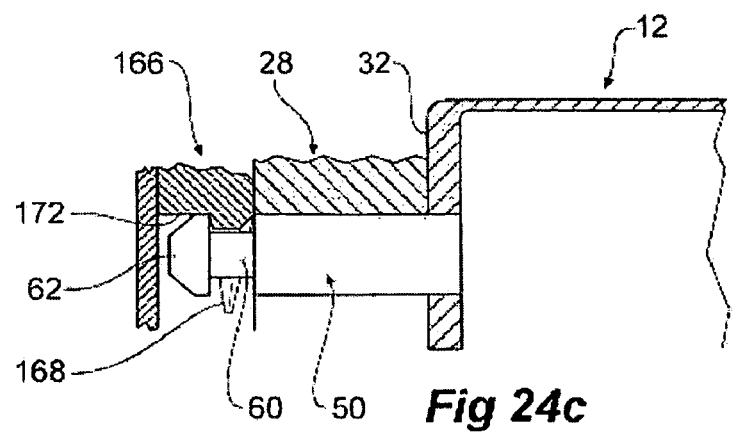
FIG. 24C illustrates a front partial cross-sectional view of FIG. 23A.

FIG. 22 illustrates the drive pin pair 50 of the larger diameter hole-saw 12 prior to insertion within the mandrel 28 and annulus 166 which are each housed within sleeve 164. FIGS. 23A–23C show the position of the drive pin pairs at the point where the annulus 30 has been rotated into its second position by means described above, and is about to be biased back to its first position to thereby engage the chamfered cap 62. FIGS. 24A–24C illustrate the drive pin pairs once engaged with annulus 166. As can be seen in the drawings, the difference in this embodiment is that the engaging aperture pair 168 of annulus 166 are shaped so that during the biased movement back to the first position, the chamfered cap 62 encounters a ramp 168 as opposed to simply a flat surface 86. Further, the ramp 168 includes a void 170 large enough for flute 60 to pass therethrough. This effectively allows the drive pin pair 50 to climb up the ramp with the action of the biasing means until it encounters surface 172 which prevents any further rotation. As those skilled in the art would appreciate, any longitudinal movement of the hole-saw is no longer possible once engaged. As can be seen in FIGS. 24A–24C the base 32 of the hole-saw 12 is forced to abut with the upper surface of the mandrel 28.

In a still further aspect of the invention, FIGS. 25A–25B illustrate an alternative type of movement of an annulus 172 which may be applied across the embodiments. Rather than being rotatable, the annulus 172 works by way of a slideable engagement. The annulus 172 includes a central bore 174, an arbour 175 or similar shaft extending therethrough, a biasing means in the form of spring 176 and a diametrically opposed engaging aperture pair 178 for engagement with a drive pin pair 180 of a hole-saw. This mechanism works in effectively the same way as previously except instead of rotating the annulus, one simple shifts the annulus so that against the spring 176 from a first position to a second position for insertion or withdrawal of a drive pin pair 180. The central bore 174 is shaped to allow for such movement.

The present invention therefore provides for a hole-saw assembly capable of quickly and easily mounting thereto hole-saws of different diameter.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A hole-saw assembly including:
a first hole-saw aligned along a central longitudinal axis, said hole-saw including a transverse base from which extends a cylindrical hole-saw body having a plurality of cutting teeth, a pair of shafts diametrically opposed about said longitudinal axis extending in the opposite direction to said hole-saw body, and a pair of diametrically opposed apertures radially disposed from said diametrically opposed shafts;
a second hole-saw including a transverse base from which extends a cylindrical hole-saw body having a plurality of cutting teeth, said second hole-saw body being of a lesser diameter to that of the first hole-saw body, said second hole-saw further including a pair of shafts diametrically opposed about said longitudinal axis extending in the opposite direction to said hole-saw body and adapted to be inserted into said diametrically opposed apertures of the first hole-saw base, said shaft pairs of the first and second hole-saws being of the same length such that once inserted, the second shaft pair extends a longitudinal distance less than that of the first shaft pair from the base of the first hole-saw; and
a mandrel coupled to said first hole-saw base via at least one annulus including a first locking means adapted to engage the shaft pair of said first hole-saw, and a longitudinally spaced apart second locking means adapted to engage the shaft pair of said second hole-saw.

2. A hole-saw assembly according to claim 1 wherein said mandrel includes a first pair of longitudinal apertures aligned for insertion therethrough of the pair of shafts from the first hole-saw, and a second pair of longitudinal apertures aligned for insertion therethrough of the pair of shafts from the second hole-saw.

3. A hole-saw assembly according to claim 1 wherein when each hole-saw shaft is inserted through said mandrel such that the base of the first hole-saw abuts with a longitudinal end of the mandrel, the first pair of shafts is received within the first locking means and the second pair of shafts is received within the second locking means.

4. A hole-saw assembly according to claim 1 wherein each of said locking means involves movement of the at least one annulus from a first position wherein insertion and withdrawal of the shaft pairs is not possible, and a second position wherein the shaft pairs may be freely inserted and withdrawn.

5. A hole-saw assembly according to claim 1 wherein the annulus includes an arrangement of aperture pairs having associated therewith a corresponding locking mechanism, the aperture pairs aligned with aperture pairs of the mandrel such that when an annulus is in the first position, the corresponding aperture pairs of the annulus and mandrel are misaligned, and when the annulus is in the second position, the corresponding aperture pairs of the annulus and mandrel are aligned.

6. A hole-saw assembly according to claim 1 wherein the annulus includes an arrangement of aperture pairs having associated therewith a corresponding locking mechanism, the aperture pairs aligned with aperture pairs of the mandrel such that when an annulus is in the first position, the corresponding aperture pairs if the annulus and mandrel are misaligned, and when the annulus is in the second position, the corresponding aperture pairs of the annulus and mandrel are aligned, said annulus being biased in the first position.

7. A hole-saw assembly according to claim 1 wherein when a shaft pair is initially received within an annulus which is biased in an engaged position, the annulus locking means includes a lip having a first surface which is encountered in the path of at least one of the shafts of the shaft pair such that insertion of the shaft causes said lip and hence said annulus to move from said first position to a second position to allow for insertion of the shafts therethrough.

8. A hole-saw assembly according to claim 1 wherein each of the shafts in each shaft pair includes a recessed portion adjacent the end of the shaft such that when said shaft has been inserted a pre-determined distance past a first surface of an annulus locking means lip, the annulus moves into an engaged position and in doing so, the recessed portion moves against the lip whereby a second flat surface of the lip prevents the shaft from being withdrawn.

9. A hole-saw assembly according to claim 1 wherein each of the shafts in each shaft pair includes a recessed portion adjacent the end of the shaft and said annulus locking means includes a lip having a first surface, a second ramped surface having a void extending therealong, and a third surface extending substantially perpendicularly to said ramped surface such that when said shaft has been inserted a pre-determined distance within said annulus, contact with the first surface causes the annulus to move back into an engaged position and in doing so, the recessed portion of the shaft moves within the void whilst the second ramped surface causes the shaft to move against the third surface so as to prevent even the slightest longitudinal movement of the shaft.

10. A hole-saw assembly according to claim 1 wherein each shaft of the shaft pairs include a chamfered cap at ends thereof adjacent the recessed portions, said chamfered caps adapted to slide against a surface of a lip in each annulus locking means to thereby move said annulus to allow for insertion through of the shaft pair.

11. A hole-saw assembly according to claim 1 wherein each shaft of the shaft pairs includes a first end chamfered cap, an adjacent first recessed portion, a second chamfered cap adjacent the first recessed portion, and a second recessed portion adjacent the second chamfered cap, said first and second chamfered caps adapted to slide against a surface of a lip in the first and/or second annulus locking means to thereby move said annulus to allow for insertion through of the shaft pair.

12. A hole-saw assembly according to claim 1 wherein the annulus is moveable between a first position whereby said first and second locking means are engaged, and a second position whereby said first and second locking means are disengaged, said movement being by way of rotation.

13. A hole-saw assembly according to claim 1 wherein the annulus is moveable between a first position whereby said first and second locking means are engaged, and a second position whereby said first and second locking means are disengaged, said movement being by way of transverse shift.

14. A hole-saw assembly including:
a first hole-saw aligned along a central longitudinal axis, said hole-saw including a transverse base from which extends a cylindrical hole-saw body having a plurality of cutting teeth, a pair of drive pins diametrically opposed about said longitudinal axis extending in the opposite direction to said hole-saw body, and a pair of diametrically opposed apertures radially disposed from said diametrically opposed drive pins;
a second hole-saw including a transverse base from which extends a cylindrical hole-saw body having a plurality of cutting teeth, said second hole-saw body being of a lesser diameter to that of the first hole-saw body, said second hole-saw further including a pair of drive pins diametrically opposed about said longitudinal axis extending in the opposite direction to said hole-saw body and adapted to be inserted into said diametrically opposed apertures of the first hole-saw base, said drive pin pairs of the first and second hole-saws being of the same length such that once inserted, the second drive pin pair extends a longitudinal distance less than that of the first drive pin pair from the base of the first hole-saw;
a mandrel including two pairs of longitudinal apertures through which said first and second pairs of drive pins are adapted to be inserted; and
an annulus coupled to said mandrel, said annulus including two pairs of diametrically opposed apertures, the first pair of apertures having associated therewith a first locking means for engaging an engagement surface of the second pair of drive pins adjacent the mandrel, and the second pair of apertures extending longitudinally beyond the first pair of apertures and having associated therewith a second locking means for engaging an engagement surface of the first pair of drive pins.

15. A hole-saw assembly according to claim 14 wherein said annulus is rotatable from a first biased position to a second position, whereby when the annulus is in the first position, each locking means engages corresponding drive pins and thereby prevents them from longitudinal movement, and when the annulus is in the second position, each locking means disengages corresponding drive pins and thereby allows for movement in the longitudinal direction.

16. A hole-saw assembly according to claim 14 wherein the first and second pairs of apertures of the annulus have associated therewith locking means capable of engaging the first and/or second drive pin pairs, where in such circumstances, the drive pins also include two correspondingly positioned engagement surfaces.

17. A hole-saw assembly including:
a first hole-saw aligned along a central longitudinal axis, said hole-saw including a transverse base from which extends a cylindrical hole-saw body having a plurality of cutting teeth, a pair of drive pins diametrically opposed about said longitudinal axis extending in the opposite direction to said hole-saw body, and a pair of diametrically opposed apertures radially disposed from said diametrically opposed drive pins;
a second hole-saw including a transverse base from which extends a cylindrical hole-saw body having a plurality of cutting teeth, said second hole-saw body being of a lesser diameter to that of the first hole-saw body, said second hole-saw further including a pair of drive pins diametrically opposed about said longitudinal axis extending in the opposite direction to said hole-saw body and adapted to be inserted into said diametrically opposed apertures of the first hole-saw base, said drive pin pairs of the first and second hole-saws being of the same length such that once inserted, the second drive pin pair extends a longitudinal distance less than that of the first drive pin pair from the base of the first hole-saw;

a mandrel including two pairs of longitudinal apertures through which said first and second pairs of drive pins are adapted to be inserted; and a first annulus coupled to said mandrel and including two pairs of diametrically opposed apertures, the first pair of apertures having associated therewith a first locking means for engaging an engagement surface of the second pair of drive pins, and the second pair of apertures allowing the engagement surface of the first pair of drive pins to extend to a second annulus coupled to the first annulus, said second annulus having associated therewith a second locking means for engaging the engagement surface of the first pair of drive pins.

18. A hole-saw assembly according to claim 17 wherein said first and second annuluses are rotatable independently of the other from a first biased position to a second position, whereby when the first or second annulus is in the first position, each corresponding locking means engages corresponding drive pins and thereby prevents them from longitudinal movement, and when the first or second annulus is in the second position, each corresponding locking means disengages corresponding drive pins and thereby allows for movement in the longitudinal direction.

19. A hole-saw assembly according to claim 17 wherein the first and second annuluses have associated therewith locking means capable of engaging the first and/or second drive pin pairs, where in such circumstances, the drive pins also include two correspondingly positioned engagement surfaces.

20. A hole-saw assembly including:

a first hole-saw aligned along a central longitudinal axis, said hole-saw including a transverse base from which extends a cylindrical hole-saw body having a plurality of cutting teeth, a pair of drive pins diametrically opposed about said longitudinal axis extending in the opposite direction to said hole-saw body, and a pair of diametrically opposed apertures radially disposed from said diametrically opposed drive pins;

a second hole-saw including a transverse base from which extends a cylindrical hole-saw body having a plurality of cutting teeth, said second hole-saw body being of a lesser diameter to that of the first hole-saw body, said second hole-saw further including a pair of drive pins diametrically opposed about said longitudinal axis extending in the opposite direction to said hole-saw body and adapted to be inserted into said diametrically opposed apertures of the first hole-saw base, said drive pin pairs of the first and second hole-saws being of the same length such that once inserted, the second drive pin pair extends a longitudinal distance less than that of the first drive pin pair from the base of the first hole-saw;

a mandrel including two pairs of longitudinal apertures, said first pair of apertures having associated therewith a recess, said second pair of apertures allowing for insertion of the first pair of drive pins; and an annulus coupled to said mandrel, said annulus including a pair of diametrically opposed apertures and an engaging lip projecting within said mandrel recess, the engaging lip having associated therewith a first locking means for engaging an engagement surface of the second pair of drive pins, and the pair of apertures having associated therewith a second locking means for engaging an engagement surface of the first pair of drive pins.

21. A hole-saw assembly according to claim 20 wherein said annulus is rotatable from a first biased position to a second position, whereby when the annulus is in the first position, each locking means engages corresponding drive pins and thereby prevents them from longitudinal movement, and when the annulus is in the second position, each locking means disengages corresponding drive pins and thereby allows for movement in the longitudinal direction.

22. A hole-saw assembly according to claim 20 wherein said annulus includes two or more locking lips which extend within a corresponding mandrel recess, and a pair of apertures having associated therewith locking means capable of engaging the first and/or second drive pin pairs, where in such circumstances, the drive pins also include two correspondingly positioned engagement surfaces.

* * * * *